United States Patent
Fujino et al.

(10) Patent No.: US 8,648,161 B2
(45) Date of Patent: Feb. 11, 2014

(54) POLYACRYLIC ACID (SALT)-BASED WATER-ABSORBENT RESIN AND A METHOD FOR PRODUCING IT

(75) Inventors: Shinichi Fujino, Himeji (JP); Eri Nagasawa, Himeji (JP); Satoshi Matsumoto, Himeji (JP); Kunihiko Ishizaki, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 13/148,356

(22) PCT Filed: Feb. 8, 2010

(86) PCT No.: PCT/JP2010/051832
§ 371 (c)(1),
(2), (4) Date: Aug. 8, 2011

(87) PCT Pub. No.: WO2010/090324
PCT Pub. Date: Aug. 12, 2010

(65) Prior Publication Data
US 2011/0306732 A1    Dec. 15, 2011

(30) Foreign Application Priority Data

Feb. 6, 2009  (JP) .................................. 2009-026807
Feb. 6, 2009  (JP) .................................. 2009-026808

(51) Int. Cl.
| | |
|---|---|
| C08F 220/06 | (2006.01) |
| C08F 118/02 | (2006.01) |
| C08F 4/44 | (2006.01) |
| C08F 4/06 | (2006.01) |
| C08F 120/02 | (2006.01) |

(52) U.S. Cl.
USPC ............ 526/317.1; 526/319; 526/123.1; 526/172; 525/329.7

(58) Field of Classification Search
USPC ............... 524/556; 525/385; 526/241, 317.1; 528/503, 502 R
See application file for complete search history.

(56) References Cited

U.S. PATENT DOCUMENTS

| | | |
|---|---|---|
| 3,885,155 A | 5/1975 | Anbar |
| 4,093,776 A | 6/1978 | Aoki et al. |

(Continued)

FOREIGN PATENT DOCUMENTS

| | | |
|---|---|---|
| CN | 1894286 | 1/2007 |
| JP | 4-356436 | 12/1992 |
| JP | 6-56931 | 3/1994 |
| JP | 6-122707 | 5/1994 |
| JP | 8-34757 | 2/1996 |
| JP | 2005-102533 | 4/2005 |
| JP | 2005-154741 | 6/2005 |
| JP | 2005-525445 | 8/2005 |
| JP | 2007-82476 | 4/2007 |

(Continued)

OTHER PUBLICATIONS

National Center for Biotechnology Information, webpage www.ncbi.nlm.nih.gov, Jul. 2011.

(Continued)

*Primary Examiner* — Liam Heincer
*Assistant Examiner* — Marilou Lacap
(74) *Attorney, Agent, or Firm* — Wenderoth, Lind & Ponack, L.L.P.

(57) ABSTRACT

The purpose of the present invention is to improve the water absorption of a water-absorbent resin without sacrificing the productivity, production cost, safety, and so on. Provided is a sustainable and renewable water-absorbent resin with excellent whiteness, which is suitable for mass consumption as disposal diapers or the like, and which can dispense with excessive purification of raw material acrylic acid. Also provided is a process for the production of a water-absorbent resin, which comprises: a step of preparing acrylic monomers; a step of polymerizing the monomers; and a step of drying the obtained aqueous gel, wherein the monomers at the time of polymerization contain at least 400 ppm of propionic acid.

14 Claims, 6 Drawing Sheets

A plurality of acrylic acids with different trace components/
e.g., propionic acid

[Flow diagram: "Acrylic acid (400 ppm or more of propionic acid)" and "Acrylic acid (less than 400 ppm of propionic acid)" → "Mixed acrylic acid (e.g., prescribed amount of propionic acid)" → (Hereinafter, to monomer)]

(56) References Cited

U.S. PATENT DOCUMENTS

| | | | |
|---|---|---|---|
| 4,367,323 | A | 1/1983 | Kitamura et al. |
| 4,427,884 | A | 1/1984 | Anbar et al. |
| 4,446,261 | A | 5/1984 | Yamasaki et al. |
| 4,683,274 | A | 7/1987 | Nakamura et al. |
| RE32,649 | E | 4/1988 | Brandt et al. |
| 4,893,999 | A | 1/1990 | Chmelir et al. |
| 5,185,413 | A | 2/1993 | Yoshinaga et al. |
| 5,244,735 | A | 9/1993 | Kimura et al. |
| 5,275,773 | A | 1/1994 | Irie et al. |
| 5,276,181 | A | 1/1994 | Casale et al. |
| 5,380,808 | A | 1/1995 | Sumiya et al. |
| 5,438,194 | A | 8/1995 | Koudijs et al. |
| 5,610,208 | A | 3/1997 | Dairoku et al. |
| 5,661,299 | A | 8/1997 | Purser |
| 6,071,976 | A | 6/2000 | Dairoku et al. |
| 6,140,395 | A | 10/2000 | Hatsuda et al. |
| 6,174,978 | B1 | 1/2001 | Hatsuda et al. |
| 6,187,872 | B1 | 2/2001 | Yanase et al. |
| 6,187,902 | B1 | 2/2001 | Yanase et al. |
| 6,228,930 | B1 | 5/2001 | Dairoku et al. |
| 6,241,928 | B1 | 6/2001 | Hatsuda et al. |
| 6,254,990 | B1 | 7/2001 | Ishizaki et al. |
| 6,335,406 | B1 | 1/2002 | Nagasuna et al. |
| 6,388,000 | B1 * | 5/2002 | Irie et al. ............... 524/556 |
| 6,403,700 | B1 | 6/2002 | Dahmen et al. |
| 6,444,744 | B1 * | 9/2002 | Fujimaru et al. ........ 524/556 |
| 6,602,950 | B1 | 8/2003 | Dentler et al. |
| 6,605,673 | B1 | 8/2003 | Mertens et al. |
| 6,620,889 | B1 | 9/2003 | Mertens et al. |
| 6,710,141 | B1 | 3/2004 | Heide et al. |
| 6,849,665 | B2 | 2/2005 | Frenz et al. |
| 6,852,517 | B1 | 2/2005 | Suthers et al. |
| 6,906,159 | B2 | 6/2005 | Dairoku et al. |
| 6,927,268 | B2 | 8/2005 | Matsumoto et al. |
| 6,987,151 | B2 | 1/2006 | Gartner et al. |
| 6,998,447 | B2 | 2/2006 | Irie et al. |
| 7,078,458 | B2 | 7/2006 | Irie et al. |
| 7,091,253 | B2 | 8/2006 | Dairoku et al. |
| 7,098,284 | B2 | 8/2006 | Torii et al. |
| 7,157,141 | B2 | 1/2007 | Inger et al. |
| 7,238,743 | B2 | 7/2007 | Matsumoto et al. |
| 7,307,132 | B2 | 12/2007 | Nestler et al. |
| 7,473,739 | B2 | 1/2009 | Dairoku et al. |
| 7,683,220 | B2 | 3/2010 | Matsunami et al. |
| 7,960,485 | B2 | 6/2011 | Funk et al. |
| 8,071,202 | B2 | 12/2011 | Furno et al. |
| 2002/0161132 | A1 | 10/2002 | Irie et al. |
| 2005/0013865 | A1 | 1/2005 | Nestler et al. |
| 2005/0046069 | A1 | 3/2005 | Sasabe et al. |
| 2005/0070671 | A1 | 3/2005 | Torii et al. |
| 2005/0113542 | A1 | 5/2005 | Irie et al. |
| 2005/0209411 | A1 | 9/2005 | Nestler et al. |
| 2005/0215734 | A1 | 9/2005 | Dairoku et al. |
| 2005/0244312 | A1 | 11/2005 | Suppes et al. |
| 2005/0288182 | A1 | 12/2005 | Torii et al. |
| 2006/0036043 | A1 | 2/2006 | Nestler et al. |
| 2006/0073969 | A1 | 4/2006 | Torii et al. |
| 2006/0088115 | A1 | 4/2006 | Chen et al. |
| 2006/0199975 | A1 | 9/2006 | Dieterle et al. |
| 2006/0204755 | A1 | 9/2006 | Torii et al. |
| 2006/0252899 | A1 | 11/2006 | Himori et al. |
| 2007/0106013 | A1 | 5/2007 | Adachi et al. |
| 2007/0129570 | A1 | 6/2007 | Shima et al. |
| 2007/0148749 | A1 | 6/2007 | Yasuda et al. |
| 2007/0167642 | A1 | 7/2007 | Oku et al. |
| 2007/0219391 | A1 | 9/2007 | Lilga et al. |
| 2007/0219521 | A1 | 9/2007 | Hird et al. |
| 2007/0232760 | A1 | 10/2007 | Fujimaru et al. |
| 2008/0004408 | A1 | 1/2008 | Stueven et al. |
| 2008/0091048 | A1 | 4/2008 | Nordhoff et al. |
| 2008/0108771 | A1 | 5/2008 | Himori et al. |
| 2008/0119626 | A1 | 5/2008 | Fujimaru et al. |
| 2008/0131945 | A1 | 6/2008 | Toraya et al. |
| 2008/0161512 | A1 | 7/2008 | Kawano et al. |
| 2008/0214750 | A1 | 9/2008 | Stueven et al. |
| 2008/0221277 | A1 | 9/2008 | Walden et al. |
| 2008/0260605 | A1 | 10/2008 | Dieterle et al. |
| 2008/0280128 | A1 | 11/2008 | Furno et al. |
| 2009/0023006 | A1 | 1/2009 | Bub et al. |
| 2009/0068440 | A1 | 3/2009 | Bub et al. |
| 2009/0105389 | A1 | 4/2009 | Walden et al. |
| 2009/0118549 | A1 | 5/2009 | Matsunami et al. |
| 2009/0131633 | A1 | 5/2009 | Flohr et al. |
| 2009/0134357 | A1 | 5/2009 | Bub et al. |
| 2009/0202805 | A1 | 8/2009 | Furno et al. |
| 2009/0227741 | A1 | 9/2009 | Walden et al. |
| 2009/0239995 | A1 | 9/2009 | Bub et al. |
| 2009/0314258 | A1 | 12/2009 | Azou |
| 2009/0325248 | A1 | 12/2009 | Marx et al. |
| 2010/0009846 | A1 | 1/2010 | Ikeuchi et al. |
| 2011/0034603 | A1 * | 2/2011 | Fujino et al. ............... 524/320 |
| 2011/0105791 | A1 | 5/2011 | Kuppinger et al. |
| 2011/0144294 | A1 | 6/2011 | Bub et al. |

FOREIGN PATENT DOCUMENTS

| | | |
|---|---|---|
| JP | 2007-283175 | 11/2007 |
| JP | 2007-291351 | 11/2007 |
| JP | 2008-532943 | 8/2008 |
| JP | 2008-534695 | 8/2008 |
| JP | 2008-537555 | 9/2008 |
| JP | 2009-96812 | 5/2009 |
| WO | 02/42418 | 5/2002 |
| WO | 02/090312 | 11/2002 |
| WO | 03/008795 | 1/2003 |
| WO | 03/051940 | 6/2003 |
| WO | 03/053482 | 7/2003 |
| WO | 2004/069915 | 8/2004 |
| WO | 2005/095320 | 10/2005 |
| WO | 2006/008024 | 1/2006 |
| WO | 2006/053731 | 3/2006 |
| WO | 2006/082188 | 8/2006 |
| WO | 2006/082189 | 8/2006 |
| WO | 2006/082197 | 8/2006 |
| WO | 2006/087084 | 8/2006 |
| WO | 2006/088254 | 8/2006 |
| WO | 2006/092271 | 9/2006 |
| WO | 2006/092272 | 9/2006 |
| WO | 2006/111402 | 10/2006 |
| WO | 2006/111403 | 10/2006 |
| WO | 2006/111404 | 10/2006 |
| WO | 2006/136336 | 12/2006 |
| WO | 2007/029851 | 3/2007 |
| WO | 2007/042494 | 4/2007 |
| WO | 2007/106099 | 9/2007 |
| WO | 2007/106100 | 9/2007 |
| WO | 2007/109128 | 9/2007 |
| WO | 2007/119528 | 10/2007 |
| WO | 2007/121037 | 10/2007 |
| WO | 2007/132926 | 11/2007 |
| WO | 2008/005364 | 1/2008 |
| WO | 2008/009842 | 1/2008 |
| WO | 2008/009843 | 1/2008 |
| WO | 2008/023039 | 2/2008 |
| WO | 2008/023040 | 2/2008 |
| WO | 2008/026772 | 3/2008 |
| WO | 2008/042958 | 4/2008 |
| WO | 2008/096713 | 8/2008 |
| WO | WO2009/130915 * | 10/2009 |

OTHER PUBLICATIONS

Chinese Office Action issued Mar. 5, 2013 in corresponding Chinese Application No. 201080006204.6, with English translation.
Chinese Office Action issued Aug. 27, 2013 in corresponding Chinese Application No. 201080006204.6 with English translation.

* cited by examiner

Fig.1 Propionic acid at the time of polymerization and water absorbency after polymerization
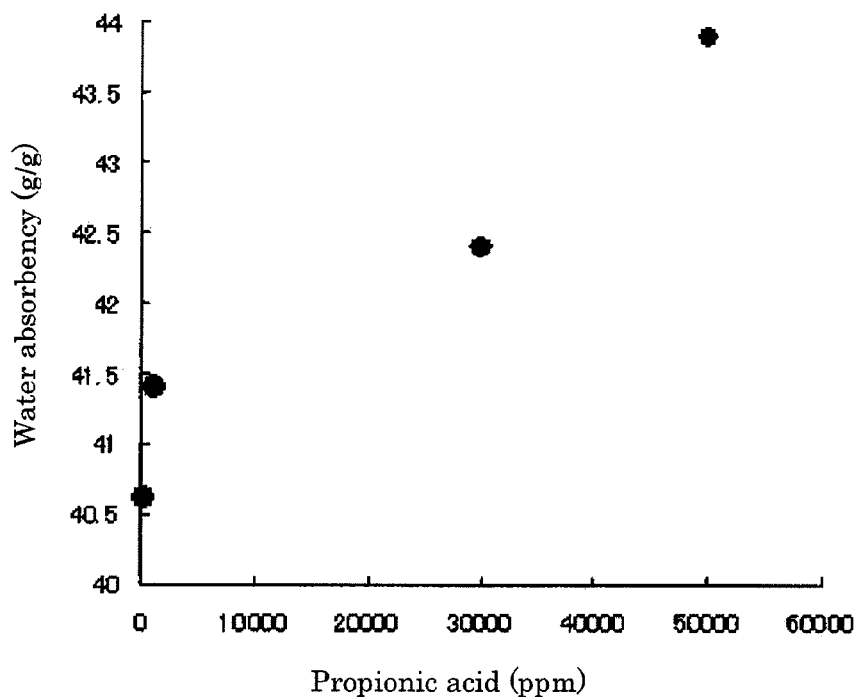

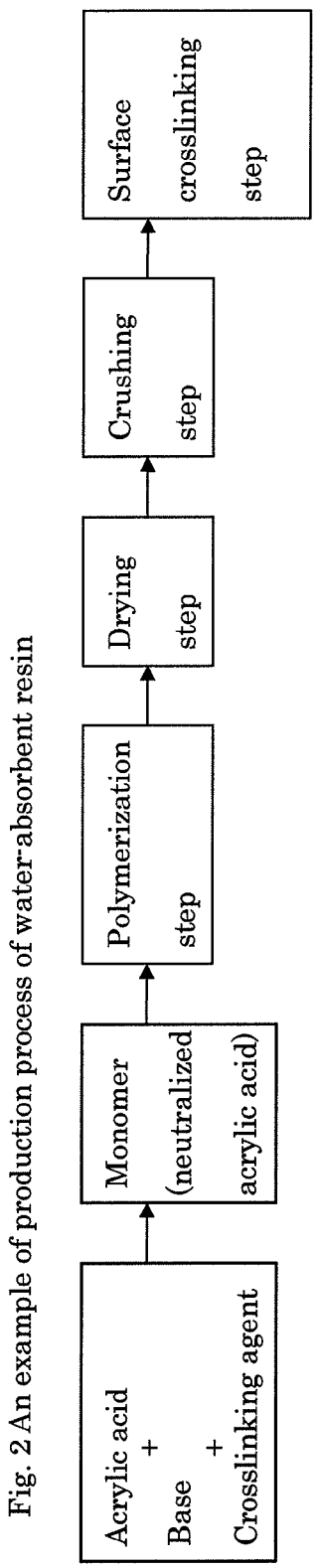
Fig. 2 An example of production process of water-absorbent resin

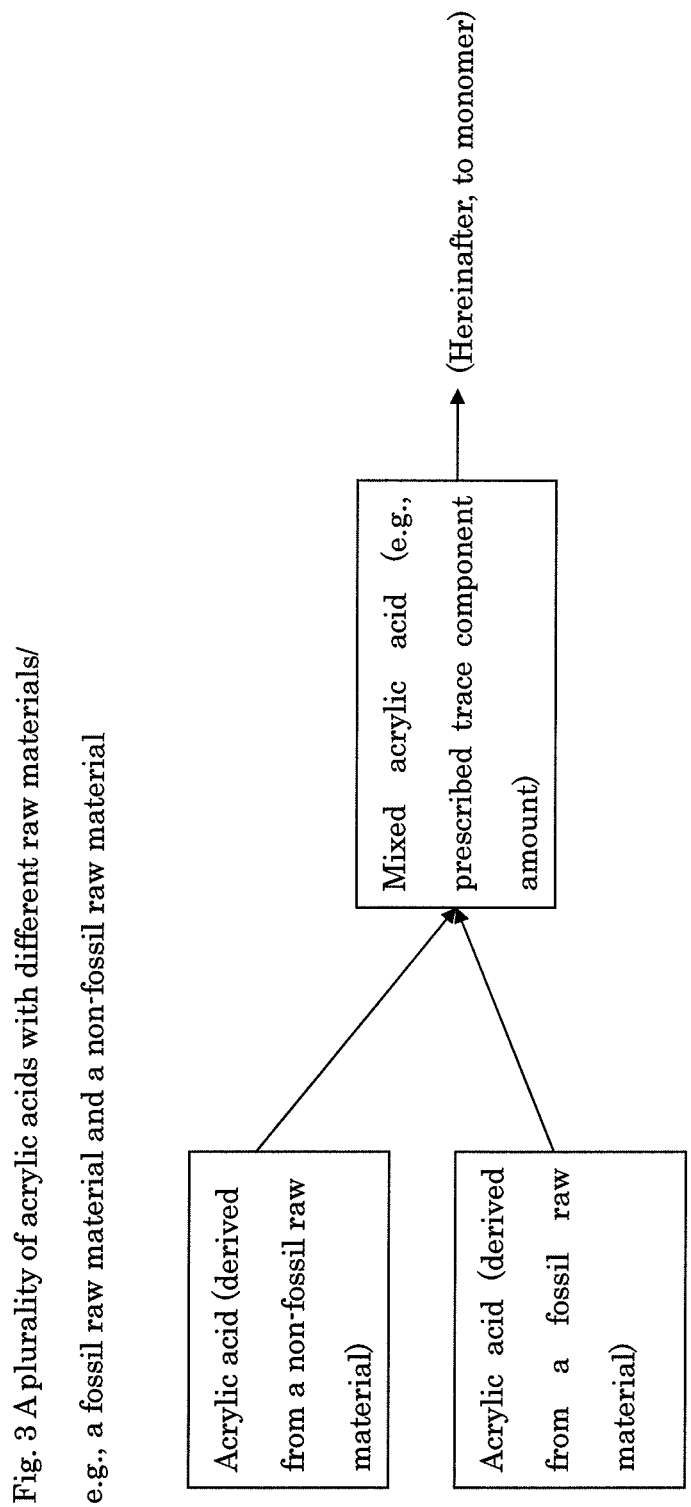
Fig. 3 A plurality of acrylic acids with different raw materials/ e.g., a fossil raw material and a non-fossil raw material Fig. 4 A plurality of acrylic acids with different trace components/ e.g., propionic acid

```
┌─────────────────────┐      ┌─────────────────────┐
│ Acrylic acid (400   │      │ Acrylic acid (less  │
│ ppm or more of      │      │ than 400 ppm of     │
│ propionic acid)     │      │ propionic acid)     │
└──────────┬──────────┘      └──────────┬──────────┘
           │                            │
           └─────────────┬──────────────┘
                         ▼
           ┌─────────────────────────────┐
           │ Mixed acrylic acid          │
           │ (e.g., prescribed amount of │──▶ (Hereinafter, to monomer)
           │ propionic acid)             │
           └─────────────────────────────┘
```

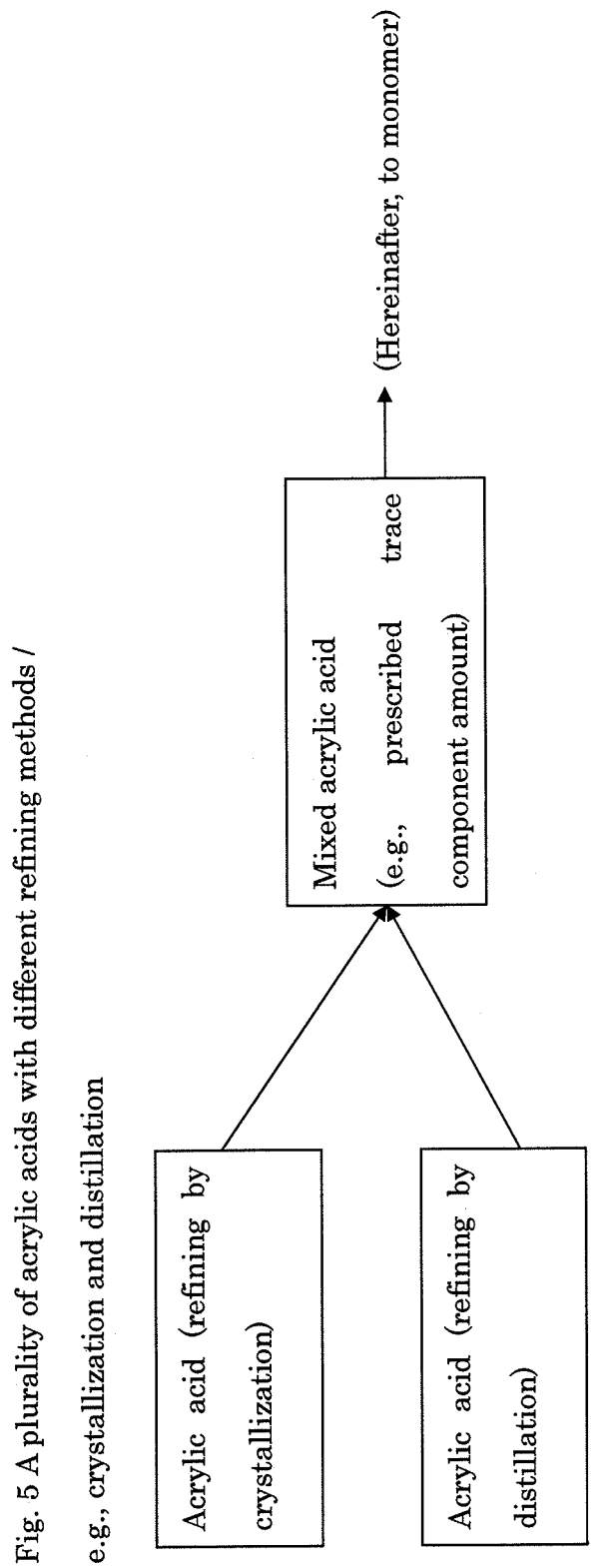
Fig. 5 A plurality of acrylic acids with different refining methods / e.g., crystallization and distillation

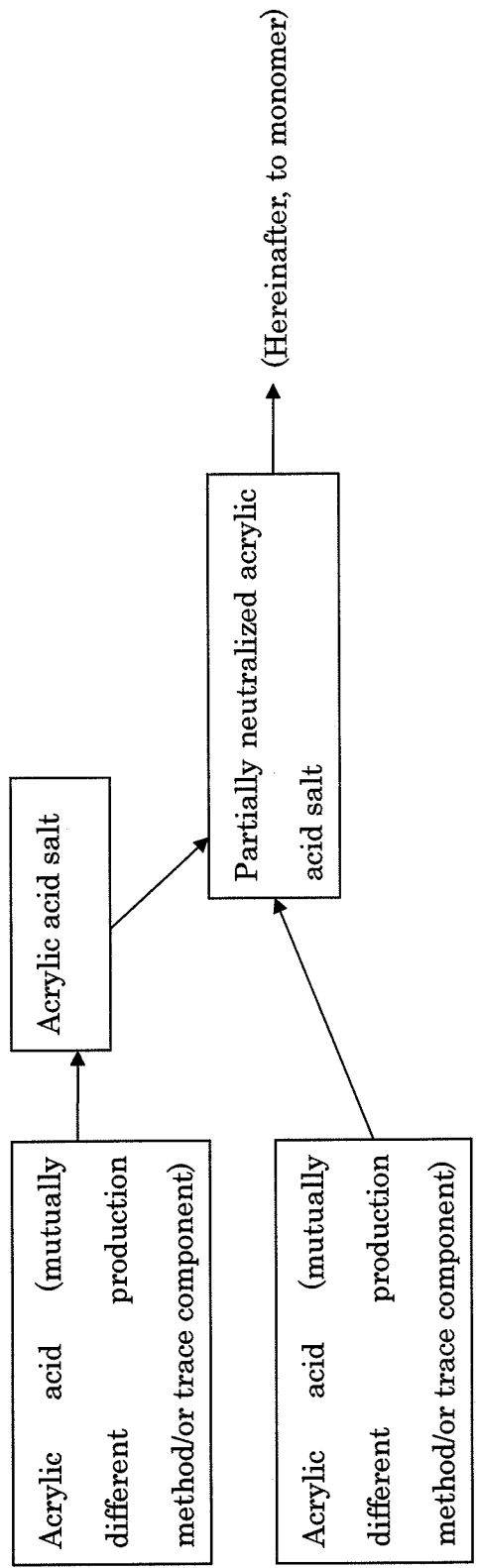
Fig. 6 A plurality of acrylic acids with different refining methods / e.g., crystallization and distillation/ one acrylic acid is mixed with another after neutralization

POLYACRYLIC ACID (SALT) -BASED WATER-ABSORBENT RESIN AND A METHOD FOR PRODUCING IT

TECHNICAL FIELD

The present invention relates to a polyacrylic acid (salt)-based water-absorbent resin and a method for producing the resin. More particularly, the present invention relates to a water-absorbent resin having high water absorbency, excellent in anti-urine property, substantially white in color, and excellent in monomer stability at the time of polymerization, and a method for producing the resin.

BACKGROUND ART

A water-absorbent resin (SAP/Super Absorbent Polymer) is a water-swellable and water-insoluble polymeric gellant, which is widely and mainly used in disposable articles including an absorbing article such as a disposable diaper, a sanitary napkin, and the like; an agricultural water retaining agent; and an industrial waterproofing agent. As a material for the water-absorbent resin, varieties of monomers and hydrophilic polymers have been proposed. Among them, a polyacrylic acid (salt)-based water-absorbent resin, which is formed by using the acrylic acid and/or its salt as a monomer, is most widely used in industrial purposes due to its high water absorption performance.

As a basic physical property of the water-absorbent resin, a high water absorption coefficient is desired and such a high water absorption coefficient can be defined by a measurement method such as CRC (Centrifuge Retention Capacity), FSC (Free Swell Capacity), etc. As a process for producing the water-absorbent resin, a large number of methods for improving the water absorbency have been proposed.

For example, Patent Literatures 1 to 4 propose methods for polymerizing un-neutralized monomers and thereafter carrying out post-neutralization (commonly known as: neutralization after acid polymerization); Patent Literature 5 proposes a method for controlling the levelness of belt polymerization; Patent Literatures 6 and 7 propose methods for controlling a polymerization temperature in a constant range; Patent Literatures 8 to 10 propose methods for scheming pulverization methods of gel after polymerization; Patent Literature 11 proposes a method for scheming drying conditions; Patent Literatures 12 and 13 propose methods of using chain transfer agents at the time of polymerization; etc.

Further, in order to improve residual monomers and soluble matter, methods for obtaining water-absorbent resins by polymerizing the acrylic acid or monomers with little impurities have been proposed and for example, methods using the acrylic acid with a little of protoanemonine and furfural (Patent Literatures 14 and 15); a method using the acrylic acid with 20 ppm or less of allyl alcohol and allyl acrylate (Patent Literature 16); and a method using the acrylic acid with a little of an acrylic acid dimer or oligomer (Patent Literature 17) are known. Moreover, as a countermeasure for preventing clogging of pipes due to easy precipitation of maleic acid, which is an impurity of the acrylic acid, a method (Patent Literature 18) of using the acrylic acid with 50 ppm or less of maleic acid has been proposed. Furthermore, also known are methods (Patent Literatures 19 and 20) for suppressing β-hydroxypropionic acid in the acrylic acid salts after neutralization to 1000 ppm or lower. Even more, also known are a method (Patent Literature 21) for suppressing the total amount of acetic acid and propionic acid in the acrylic acid to 400 ppm or lower in terms of acidic smell of the water-absorbent resin, and a method (Patent Literature 22) for suppressing the total amount of hydroquinone and benzoquinone to 0.2 ppm or lower in terms of coloring.

CITATION LIST

Patent Literature

Patent Literature 1
U.S. Pat. No. Re. 32,649
Patent Literature 2
U.S. Pat. No. 6,403,700
Patent Literature 3
U.S. Pat. No. 6,187,872
Patent Literature 4
U.S. Pat. No. 6,602,950
Patent Literature 5
U.S. Pat. No. 6,241,928
Patent Literature 6
U.S. Pat. No. 6,174,978
Patent Literature 7
U.S. Pat. No. 5,380,808
Patent Literature 8
U.S. Pat. No. 5,275,773
Patent Literature 9
U.S. Pat. No. 6,140,395
Patent Literature 10
U.S. Patent Application Publication No. 2005/0046069
Patent Literature 11
U.S. Pat. No. 6,187,902
Patent Literature 12
U.S. Pat. No. 5,185,413
Patent Literature 13
U.S. Pat. No. 6,335,406
Patent Literature 14
U.S. Pat. No. 6,927,268
Patent Literature 15
U.S. Pat. No. 7,238,743
Patent Literature 16
International Publication No. 2006/053731
Patent Literature 17
U.S. Patent Application Publication No. 2006/0036043
Patent Literature 18
U.S. Patent Application Publication No. 2008/0091048
Patent Literature 19
U.S. Pat. No. 6,388,000
Patent Literature 20
U.S. Pat. No. 6,998,447
Patent Literature 21
U.S. Patent Application Publication No. 2005/0209411
Patent Literature 22
U.S. Pat. No. 6,444,744

SUMMARY OF INVENTION

Technical Problem

However, the methods of the above-mentioned Patent Literature 1 to 11 involving control of a polymerization step, a gel pulverization process, a drying process, etc. are insufficient in their effects or result in increase of production cost or decrease of productivity along with installation of new facilities and addition of steps or in some cases, other physical properties are sacrificed. Further, regarding Patent Literatures 12 and 13, addition and use of new auxiliary raw materials represented by a chain transfer agent also result in not only increase of the cost due to the new raw materials but also problems of inhibition or delay of polymerization as well as coloring, safety, and malodor due to residual, depending on the raw material compounds.

Particularly, there are problems of not only insufficiency of improvement of coloring immediately after production of the water-absorbent resin but also polymerization reaction control at the time of production and deterioration of physical properties.

That is, in the case of lessening a polymerization inhibitor or adding another coloring prevention agent to monomers to improve coloring of the water-absorbent resin, the coloring of the water-absorbent resin is improved (whiteness is improved) to a certain extent; however, problems of deterioration of the physical properties of the water-absorbent resin and decrease of the stability of the monomers are found. Particularly, in the case of polymerization (e.g., 1 Mt/hr) in industrial scale, or in the case of polymerization starting at a high temperature or polymerization in a high concentration, a small amount of gel is accumulated in a monomer tank or a pipe and it results in a problem of lowering the productivity because of periodic cleaning of the gel by-product.

Further, regarding to Patent Literatures 14 to 20 or the like, techniques of decreasing impurities of the acrylic acid have been known; however, it is difficult to simultaneously decrease all of these impurities and it leads to increase of the cost of the raw material acrylic acid and decrease of the yield. Particularly, in recent years, in terms of sustainability, production methods of chemical products derived from non-fossil raw materials but not from petroleum have been proposed; however, since the acrylic acid derived from non-fossil raw materials (natural products) differs from conventional acrylic acid derived from fossil raw materials (petroleum) in the production process and trace components, it has sometimes been very difficult to lower the impurities by a conventional method of refining the acrylic acid.

In view of the above-mentioned conventional problems of the art, an object of the present invention is to improve the water absorbency, which is one physical property of a water-absorbent resin, without sacrificing the productivity, production cost, safety, etc. Further, preferably, the present invention provides a water-absorbent resin to be consumed heavily as disposable diapers or the like by using the acrylic acid, which is a raw material for the water-absorbent resin, particularly the acrylic acid derived from non-fossil raw materials without excess refining of the acrylic acid; that is, providing a sustainable and renewable water-absorbent resin excellent in whiteness.

Solutions to the Problems

Inventors of the present invention have made various investigations to solve the above-mentioned problems and have found that the water absorbency of a water-absorbent resin to be obtained can be improved by making propionic acid in an amount of 400 ppm or more coexist in a monomer at the time of polymerization, and the finding has now led to completion of the invention. Further, the inventors have found that the acrylic acids can be used economically at a high yield and a water-absorbent resin with high physical properties can be obtained economically and stably by using a plurality of the acrylic acids, and the finding has now led to completion of the invention. Furthermore, the inventors have found that even if propionic acid is used for producing a water-absorbent resin or even if no excess refining of the acrylic acid containing propionic acid (particularly the acrylic acid of a non-fossil raw material) is carried out, acid smell can be removed by adding a basic substance or removing propionic acid in the drying step, and the finding has now led to completion of the invention.

That is, to solve the above-mentioned problems, the present invention provides a process for producing a polyacrylic acid (salt)-based water-absorbent resin involving a step of preparing a monomer using the acrylic acid; a step of polymerizing the monomer; and a step of drying the obtained hydrogel, in which the monomer contains 400 ppm or more of propionic acid at the time of polymerization.

Further, the present invention provides a process for producing a polyacrylic acid (salt)-based water-absorbent resin involving a step of preparing a monomer using the acrylic acid; a step of polymerizing the monomer; and a step of drying the obtained hydrogel, in which the monomer is prepared by mixing a plurality of the acrylic acids containing different amounts of propionic acids.

Furthermore, the present invention provides a process for producing a polyacrylic acid (salt)-based water-absorbent resin involving a step of preparing a monomer using the acrylic acid; a step of polymerizing the monomer; and a step of drying the obtained hydrogel, in which the monomer is prepared by mixing a plurality of the acrylic acids obtained in different production processes.

Still more, to solve the above-mentioned problems, the present invention provides a polyacrylic acid (salt)-based water-absorbent resin containing a basic substance 1.1 to 1000 times by mass with respect to propionic acid. Further, the present invention provides a polyacrylic acid (salt)-based water-absorbent resin using the acrylic acid derived from a non-fossil raw material and the acrylic acid derived from a fossil raw material at a ratio of 1/99 to 99/1.

Effects of the Invention

A water-absorbent resin with a high water absorbency can be obtained by using a monomer with a propionic acid content of 400 ppm or higher as a raw material of the water-absorbent resin. Further, since it is no need to refine the acrylic acid (particularly, the acrylic acid derived from a non-fossil raw material) for removing propionic acid to an excess extent, the acrylic acid can be used economically and stably as a raw material of the water-absorbent resin and also an economical and sustainable water-absorbent resin can be obtained.

BRIEF DESCRIPTION OF THE DRAWINGS

FIG. 1 is a graph showing a correlation of the propionic acid content in a monomer to be subjected to polymerization and the water absorbency of the water-absorbent resin to be obtained.

FIG. 2 is an explanatory drawing showing a production process of a common water-absorbent resin.

FIG. 3 is a schematic drawing showing the steps in the case of using different the acrylic acids as raw materials.

FIG. 4 is a schematic drawing showing the steps in the case of using the acrylic acids with different impurity amounts.

FIG. 5 is a schematic drawing showing the steps in the case of using the acrylic acids refined by different refining methods.

FIG. 6 is a schematic drawing showing the steps in the case of using the acrylic acids refined by different refining methods and involving a step of neutralizing solely one of the acrylic acid and thereafter mixing the acrylic acid with another.

MODE FOR CARRYING OUT THE INVENTION

The objects, features and advantages of the invention will be more readily apparent from the following detailed description. Hereinafter, the present invention will be described more in detail.

(1) Definition of Terms (a) "Water-Absorbent Resin"

Water-absorbent resin is a swellable and water-insoluble polymeric gallant. The water absorbency (CRC) is generally 5 g/g or higher, preferably 10 to 100 g/g, and more preferably 20 to 80 g/g. Further, extractables are generally 0 to 50 mass % or lower, preferably 0 to 30 mass %, more preferably 0 to 20 mass %, and even more preferably 0 to 10 mass %.

The water-absorbent resin is not limited to be embodiments of 100 mass % of a polymer and may contain other additives (described below) to the extent of retaining the above-mentioned characteristics. That is, even a water-absorbent resin composition is generally named as a water-absorbent resin in the present invention. The content of the polyacrylic acid (salt)-based water-absorbent resin is preferably 70 to 99.9 mass % in the entire water-absorbent resin, more preferably 80 to 99.7 mass %, and even more preferably 90 to 99.5 mass %. The components other than the water-absorbent resin are preferably water in terms of the water absorption speed and impact resistance of powder (particles) and may include, if necessary, additives described below.

(b) "Polyacrylic Acid (Salt)"

Polyacrylic acid (salt) is a polymer containing mainly the acrylic acid (salt) as a repeating unit of the polymer. The acrylic acid (salt) as a monomer excluding a cross-linking agent is in an amount of indispensably 50 to 100% by mole, preferably 70 to 100% by mole, more preferably 90 to 100% by mole, and even more preferably substantially 100% by mole. The acrylic acid salt as the polymer indispensably contains a water-soluble salt and preferably contains a monovalent salt, more preferably an alkali metal salt or ammonium salt, particularly preferably an alkali metal salt, and even more preferably sodium salt.

(c) "Early-Phase Coloring of Water-Absorbent Resin"

This is a color of a water-absorbent resin immediately after production of the water-absorbent resin in a plant or after shipment to users. Generally, defined by control of the color before shipment from a plant (L/a/b value, YI value, WB value, etc.)

(d) "Coloring Over Time of Water-Absorbent Resin"

A problem of gradual coloring (generally, yellowing or brownish discoloring) of a water-absorbent resin in an unused state or un-swollen state for a long term preservation or distribution after the above-mentioned (c). For example, coloring of the water-absorbent resin in an unused diaper and it may possibly result in degrade of the product value of a disposable diaper. Since it is a problem for several months or several years at room temperature, it is examined by an accelerating test (high temperature and high humidity) described below.

(e) "EDANA" and "ERT"

This is the abbreviation of European Disposables and Nonwovens Associations. A measurement method (ERT/EDANA Recommended Test Method) of a water-absorbent resin on the basis of European Standards (almost Global Standards) as defined below. Reference to the original text of ERT (several pages in English), a published document (revised in 2002), for details.

(f) "CRC" (ERT 441.2-02).

CRC is centrifuge retention capacity of a water-absorbent resin. CRC is a water absorbency (unit: g/g) measured by freely swelling the water-absorbent resin in an 0.9 mass % aqueous saline solution for 30 minutes and thereafter draining the resin by centrifugal separation.

(g) "AAP" (ERT 442.2-02).

A water absorbency against pressure of a water-absorbent resin. A water absorbency (unit: g/g) in the case of swelling the water-absorbent resin in an 0.9 mass % aqueous saline solution for 1 hour under a load of 21 gEcm$^2$.

(h) "Extractables" (ERT 470.2-02).

Soluble components of a water-absorbent resin. Measurement is carried out by adding 1 g of the water-absorbent resin to 200 g of an 0.9 mass % aqueous saline solution, stirring the solution for 16 hours, and measuring the amount of a dissolved resin (polymer) by pH titration (unit: mass %).

(i) "FSC" (ERT 440.2-02).

A free swelling capacity of a water-absorbent resin. The water absorbency of the water-absorbent resin to an 0.9 mass % aqueous saline solution without draining by centrifugal separation.

(j) "Residual Monomers (ERT 410.2-02)".

The amount of residual monomers eluted to an 0.9 mass % aqueous saline solution from a water-absorbent resin is measured by liquid chromatography.

(k) "Particle Size Distribution (ERT 420.2-02)".

Particle size distribution measured by sieving classification.

(l) Other Definitions of Water-Absorbent Resin in EDANA (Standardized in 2002).

"pH" (ERT 400.2-02) The pH of a water-absorbent resin.

"Moisture Content" (ERT 430.2-02) The water content of a water-absorbent resin.

"Flow Rate" (ERT 450.2-02) The flow down speed of a water-absorbent resin powder.

"Density" (ERT 460.2-02) The bulk specific density of a water-absorbent resin.

"Respirable Particles" (ERT 480.2-02)

"Dust" (ERT 490.2-02)

(2) Monomer (Excluding a Cross-Linking Agent)

A monomer of the present invention contains the above-mentioned acrylic acid or its salt as a main component and in terms of water absorption characteristics and decrease of the residual monomers, the acid groups of a polymer are preferable to be neutralized and the neutralization ratio is 10 to 100% by mole, further 30 to 95% by mole, particularly 50 to 90% by mole, and even more preferably 60 to 80% by mole. The neutralization may be carried out for the polymer (hydrogel) after polymerization or for the monomer; however, in terms of productivity and improvement of AAP, neutralization of the monomer is preferable. Consequently, the monomer preferable in the present invention is a partially neutralized salt of the acrylic acid. In addition, "monomer" in the present invention means one kind monomer or a mixture of a plurality of monomers or a monomer composition.

In terms of acid smell derived from a saturated organic acid (particularly propionic acid) described below, the neutralization ratio is more preferable as it is higher and in terms of the removal at the time of drying, the neutralization ratio is more preferable as it is lower. Accordingly, in terms of the acid smell, it is one of preferable embodiments that a portion of the saturated organic carboxylic acid is evaporated or removed by adjusting the neutralization ratio at the time of polymerization, more preferably, the neutralization ratio before the drying to be 80% by mole or lower, more preferably 70% by mole or lower, and even more preferably 60% by mole or lower and thereafter a basic substance is added to the polymer powder surface.

With respect to the neutralization ratio, in the case a saturated organic carboxylic acid, particularly, a carboxylic acid, in an amount of a range described below (e.g., 2 mass % or lower and further 2000 ppm or lower) remains in the water-absorbent resin to be obtained, that is, in the case the saturated organic carboxylic acid, particularly, propionic acid, contained in the monomer cannot be removed sufficiently after the polymerization, even if the saturate organic carboxylic acid in the same amount (ppm) is contained in the water-absorbent resin, the ratio of the volatile un-neutralized carboxylic acid is high in the case of low neutralization and so that the problem of malodor may occur. Therefore, in order to suppress acid smell, the neutralization ratio of the obtained polyacrylic acid salt type water-absorbent resin is controlled to be such a high final neutralization ratio as to keep in a range of 10 to 100% by mole, or further 30 to 95% by mole, and it is preferable to be increased successively to 65% by mole or higher, 70% by mole or higher, 75% by mole or higher, 80% by mole or higher, 85% by mole or higher, and 90% by mole or higher. Such adjustment of the neutralization ratio is performed by adding a base during the polymerization of the monomer or after polymerization.

Further, in the present invention, a hydrophilic or hydrophobic unsaturated monomer may be used besides an acrylic acid (salt). Monomers usable may include methacrylic acid, maleic anhydride, 2-(meth)acrylamide-2-methylpropanesulfonic acid, (meth)acryloxyalkane sulfonic acid, N-vinyl-2-pyrrolidone, N-vinylacetamide, (meth)acrylamide, N-isopropyl(meth)acrylamide, N,N-dimethyl(meth)acrylamide, 2-hydroxyethyl(meth)acrylate, methoxypolyethylene glycol (meth)acrylate, polyethylene glycol(meth)acrylate, stearyl acrylate, and their salts.

(3) Crosslinking Agent (Inner Crosslinking Agent)

In the present invention, in terms of the water-absorbent properties, use of a crosslinking agent (i.e.; inner crosslinking agent) as a monomer is particularly preferable. The crosslinking agent is used in an amount of 0.001 to 5% by mole, preferably 0.005 to 2% by mole, more preferably 0.01 to 1% by mole, and even more preferably 0.03 to 0.5% by mole to the monomer excluding the cross-linking agent, in terms of physical aspect.

Examples usable as the cross-linking agent are one or more of polymerizable cross-linking agents polymerizable with the acrylic acid, reactive cross-linking agents reactive on a carboxyl group, and cross-linking agents having both of these properties. Concrete examples are, as a polymerizable cross-linking agent, compounds having at least two polymerizable double bonds in a molecule such as N,N'-methylenebisacrylamide, (poly)ethylene glycol di(meth)acrylate, (polyoxyethylene)trimethylolpropane tri(meth)acrylate, poly(meth)allyloxyalkanes, etc. Further, examples of the reactive cross-linking agent are covalent-binding crosslinking agents such as polyglycidyl ether (ethylene glycol diglycidyl ether or the like), poly alcohols (propanediol, glycerin, sorbitol, etc.), and ion-binding cross-linking agents such as polyvalent metal compounds of aluminum or the like. Among these cross-linking agents, in terms of water-absorbent properties, cross-linking agents polymerizable with the acrylic acid, particularly, acrylate type, allyl type, and acrylamide type polymerizable cross-linking agents are preferably used.

(Neutralizing Salt)

Preferable examples as a basic substance to be used for neutralization of the acrylic acid may include monovalent bases such as ammonia, alkylamine, alkanolamine, alkali metal hydroxides such as sodium hydroxide, potassium hydroxide, and lithium hydroxide, and alkali metal(hydrogen)carbonates such as sodium(hydrogen)carbonate, potassium(hydrogen)carbonate, etc. Particularly, in terms of decrease of the residual monomers, neutralization into an alkali metal acrylate especially with sodium hydroxide is preferable. The conditions or the like in these neutralization treatments are exemplified in International Publication No. 2006/522181 and the disclosed conditions are applicable for the present invention. The neutralization temperature is properly determined in a range of 10 to 100° C., more particularly 30 to 90° C., and a neutralization method described below is preferable to decrease the residual monomers.

(5) Propionic Acid

In this application, a first production method is characterized in that a prescribed amount or more of propionic acid is made to coexist. The present amount of propionic acid is indispensably 400 ppm or higher. The amount of propionic acid is preferably 500 ppm or higher, more preferably 650 ppm or higher, furthermore preferably 800 ppm or higher, and even more preferably 1000 ppm or higher. Generally, the upper limit is adjusted to be preferably 5 mass % or lower, more preferably 2 mass % or lower, furthermore preferably 1 mass % or lower, and even more preferably 0.5 mass % or lower. In the case the present amount of propionic acid is low, the effect to improve the water absorbency is not caused or very slightly caused. In the case the amount of propionic acid is high, it is disadvantageous in terms of the cost and there is a problem of malodor (acid smell) due to residual propionic acid. Further, if excess refining of the acrylic acid (particularly the acrylic acid derived from a non-fossil raw material) is carried out on purpose to remove propionic acid, it results in a problem of decrease of yield and increase of the cost, and therefore, it is preferable to leave propionic acid in a prescribed amount or more (e.g., 400 ppm or higher) in the acrylic acid after the refining. It is preferable in the present invention that propionic acid, which is a malodor-causative substance, is allowed to exist in a prescribed amount at the time of polymerization and thereafter is removed from the water-absorbent resin after polymerization rather than propionic acid is removed from the acrylic acid. In addition, "ppm" employed in the present invention is entirely on the basis of mass standard. The upper and lower limits may be determined properly in the above-mentioned ranges in accordance with the improvement effect of the water absorbency, acid smell, and other physical properties and it may be determined properly in a range of 500 ppm to 1 mass %; 650 ppm to 1 mass % (further 0.5 mass %); and 800 ppm to 1 mass % (further 0.5 mass %).

Additionally, propionic acid means a concept including a propionic acid salt and in the neutralized acrylic acid salt type monomer, the propionic acid is also neutralized at almost the same neutralization ratio as that of the monomer and in this application, the total of un-neutralized propionic acid and its salt (particularly monovalent salt) in the monomer is defined as the propionic acid amount. In the case the monomer is obtained by neutralization of the acrylic acid containing a prescribed amount (ppm) of a saturated aliphatic carboxylic acid, the content of the saturated aliphatic carboxylic acid in the monomer (the acrylic acid salt) after neutralization is substantially same as that of the acrylic acid before neutralization.

Such propionic acid may exist in a prescribed amount in the monomer at the time of polymerization, and, therefore, the prescribed amount of propionic acid may be added in the preparation process of the monomer or by the time of polymerization after the preparation. To simplify the step of adding propionic acid, in terms of even mixing or dissolution of propionic acid to the monomer, it is preferable to dissolve or add propionic acid in the acrylic acid, which is the main component in the monomer, particularly in the un-neutralized acrylic acid. Propionic acid may be dissolved in the acrylic acid or one or more kinds of acrylic acids containing prescribed amounts of propionic acid as an impurity may be used as they are. That is, as a preferable method, the monomer containing the prescribed amount of propionic acid may be obtained by using acrylic acid containing 400 ppm or more of propionic acid at least partially, for example, 1 mass % or more, 10 mass % or more, 20 mass % or more, or 30 mass % or more in the total monomer or in the total acrylic acid; or further adding propionic acid as required.

In general, acrylic acid obtained by vapor-phase oxidation of propylene sometimes contains 300 ppm to several tens ppm or lower of propionic acid as an impurity; however, in the present invention, acrylic acid (un-neutralized acrylic acid) containing propionic acid in an amount more than before is preferable to be used, and the amount of propionic acid in the acrylic acid is preferably 400 ppm or higher, more preferably 500 ppm or higher, furthermore preferably 650 ppm or higher, moreover preferably 800 ppm or higher, and even more preferably 1000 ppm or higher. The amount of propionic acid in the above-mentioned acrylic acid is preferably 5 mass % or lower, more preferably 2 mass % or lower, furthermore preferably 1 mass % or lower, and even more preferably 0.5 mass % or lower. Additionally, in the case a plurality of acrylic acids described below are used in combination, it is preferable for preparation of the monomer that the amount of one of the acrylic acids is within the range.

In a case of adjusting the amount of propionic acid in acrylic acid, in terms of the cost and steps, it is preferable to prepare the monomer containing a prescribed amount of propionic acid by using a plurality of acrylic acids containing propionic acid in different amounts.

(6) Conventional Amounts of Acetic Acid and Propionic Acid

It is well known that a very small amount of acetic acid and propionic acid are contained in acrylic acid, and in Examples 1 to 4 of the above-mentioned Patent Literature 22 (U.S. Pat. No. 6,444,744), acrylic acid containing 100 ppm of acetic acid or 100 ppm of propionic acid is produced and thereafter a water-absorbent resin is produced using the acrylic acid.

Further, it is known in the above-mentioned Patent Literature 21 (US Patent Application Publication No. 2005/0209411) that acetic acid and propionic acid in the acrylic acid are causes of malodor (acid smell) of a water-absorbent resin and in the opened US patent application, a water-absorbent resin with little malodor is provided by carrying out polymerization in presence of acetic acid and propionic acid in total of 400 ppm or lower. In Comparative Example of Patent Literature 21, polymerization in presence of 1200 ppm of acetic acid and 300 ppm of propionic acid is disclosed.

Examples in U.S. Pat. No. 6,710,141 describe polymerization of acrylic acid (no description of the amount) containing less than 2000 ppm of acetic acid and less than 600 ppm of propionic acid to obtain a water-absorbent resin. Further, Japanese Patent Application Publication, Tokukaihei, No. 8-34757 discloses a refining method of acrylic acid for decreasing acetic acid to 0.01 mass % or lower, regarding acetic acid, which is a cause of malodor of a water-absorbent resin.

In this application, with respect to acetic acid and propionic acid which are considered to cause a negative effect in the malodor issue and increase of which is regarded as a problem, it is found that existence of propionic acid in a prescribed amount exceeding a conventional amount (e.g. 300 ppm) in the water-absorbent resin is rather efficient to improve the water absorbency of the water-absorbent resin and the finding leads to completion of the invention. In the present invention, it is found that as compared with propionic acid ($C_2H_5COOH$), acetic acid ($CH_3COOH$) is less or scarcely effective to improve the water absorbency (CRC) of the invention. Use of acetic acid is found to be a problem not only in the effect but also in the malodor since acetic acid has a low boiling point as compared with propionic acid. With respect to propionic acid and acetic acid determined to be harmful in the same way in Patent Literature 19, the present invention increases the water absorbency by using a prescribed amount or more of propionic acid and further improves acid smell by removal (particularly drying, more particularly drying by azeotropic draining) after polymerization or by adding a basic substance thereto.

Further, as a conventional problem (a problem to be solved by the invention), in order to carry out sufficient refining of acrylic acid for removal of acetic acid and propionic acid until the water-absorbent resin becomes free from malodor, it is conventionally needed to carry out highly advanced one-step or multi-step refining by distillation or crystallization since the boiling points and melting points and the structures of these acids are similar. Such highly advanced refining sacrifices the cost of the acrylic acid and yield and consequently also affects the cost of the water-absorbent resin. Such a problem is, as described above, more significant for the acrylic acid derived from a non-fossil raw material. However, the method of the present invention which requires no excess refining of the acrylic acid for removing acetic acid and propionic acid, uses a prescribed amount of propionic acid as it is for the water-absorbent resin, and removes the acids (particularly drying, more particularly drying by azeotropic dewatering) or adds a basic substance after polymerization is suitable for economically producing the water-absorbent resin. Consequently, even if the effect of the present invention to improve the water absorbency is low (or (almost) scarcely caused), the production cost of the water-absorbent resin can be saved by carrying out no excess refining of the acrylic acid for removing acetic acid and propionic acid and using the acrylic acid containing a prescribed amount of propionic acid as it is for the water-absorbent resin.

(7) Acetic Acid

In the present invention, it is preferable to decrease residual acetic acid and propionic acid to 1 mass % or less in the water-absorbent resin due to the problem of malodor (acid smell) and it is preferable to evaporate or remove these acids by heating treatment as described below, particularly heat drying, and more particularly azeotropic dewatering. The propionic acid amount, further the total of acetic acid and propionic acid, in the obtained water-absorbent resin is controlled to 0.5 mass % or less, further 0.3 mass % or less, and furthermore 0.1 mass % or less in terms of the malodor. Acetic acid (boiling point 118° C.) with a low boiling point as compared with propionic acid (boiling point 141° C.) and of which the load in the evaporation step is low is preferable to be less in the raw material in terms of the malodor and the monomer is preferable to contain less acetic acid than propionic acid or contain acetic acid to a ND level (Not Detected).

That is, not limited to conventional acrylic acid described in the description (6) of the above-mentioned Patent Literature 21 (US Patent Application Publication No. 2005/0209411) (acetic acid 1200 ppm and propionic acid 300 ppm), acrylic acid generally contains more acetic acid as compared with propionic acid. In the present invention using propionic acid to improve the water absorbency, it is no need to increase acetic acid, which is a cause of malodor, along with the increase of propionic acid, and the amount of acetic acid in the acrylic acid is preferably lower than that of propionic acid or ND (Not Detected).

The amount of acetic acid in the monomer or the acrylic acid is 1000 ppm or lower or less than that of propionic acid and more concretely, the amount of acetic acid is preferably 0 to 1000 ppm, more preferably 800 ppm or lower, and furthermore preferably 600 ppm or lower. It is also preferably less than 1 times by mass to that of propionic acid, more preferably in a range of 0.01 to 0.9 times by mass, and further more preferably in a range of 0.05 to 0.8 times by mass. Further, the mass (ppm) and the ratio of acetic acid are preferable to be satisfied both simultaneously.

(8) Polymerization Inhibitor

A polymerization initiator is preferably contained at the time of polymerization. Examples of the polymerization initiator are N-oxyl compounds, manganese compounds, and substituted phenol compounds exemplified in International Publication No. 2008/096713 and preferably substituted phenols and particularly methoxyphenols.

Preferably usable methoxy phenols are concretely o-, m-, and p-methoxyphenols, and methoxyphenols further having one or more substituent groups such as methyl, tert-butyl, hydroxyl, or the like and particularly preferable one in the present invention is p-methoxyphenol. The content of methoxyphenols may be 10 to 200 ppm, preferably 5 (further 10) to 160 ppm, more preferably 10 to 100 ppm, furthermore preferably 10 to 80 ppm, and even more preferably 10 to 70 ppm. In the case the content of p-methoxyphenol exceeds 200 ppm, a problem of coloring (yellowing/yellow discoloring) of the obtained water-absorbent resin is caused. Further, in the case the content of p-methoxyphenol is less than 10 ppm, particularly less than 5 ppm, that is, p-methoxyphenol, which is a polymerization inhibitor, is removed by refining by distillation or the like, not only there is a risk of occurrence of polymerization before starting of intentional polymerization but also, surprisingly, the polymerization speed is rather delayed and therefore, it is not preferable.

(9) Fe Amount

The monomer in the present application contains preferably iron and/or no iron. The iron amount in the monomer (on the basis of $Fe_2O_3$) is preferably 0 to 5 ppm or lower, more preferably 0 to 2 ppm or lower, furthermore preferably 0 to 1 ppm or lower, moreover preferably 0 to 0.1 ppm or lower, and even more preferably 0.05 ppm or lower. If the content of Fe is low, it is preferable in terms of coloring of the water-absorbent resin after polymerization over time and durability; however, in the case it is extremely low, it is disadvantageous in terms of the refining cost as compared with the effect and further, there is not only a risk of occurrence of the polymerization before adding of the polymerization initiator but also a possibility of contradictory delay of polymerization even if the polymerization initiator is added. Consequently, existence in a small amount of Fe is allowed or preferably desired in some cases. Including the lower limit, the Fe amount ($Fe_2O_3$) in the monomer is preferably 0.002 to 2 ppm, more preferably 0.01 to 1 ppm, and even more preferably 0.02 to 0.5 ppm.

In the case the Fe amount exceeds the above-mentioned range, the water-absorbent resin is colored or deteriorated and therefore, it is not preferable. Also, not only it takes a cost to decrease Fe to ND (zero) but also no effect corresponding to the cost can be obtained. Rather, the polymerization speed may possibly be delayed in the case of Redox polymerization.

The Fe amount can be measured by an ICP emission spectroscopic analysis method described in, for example, JIS K1200-6. An ICP emission spectroscopic analyzer is commercialized as ULTIMA, or the like, manufactured by HORIBA Ltd.

As Fe to be used in the present invention, Fe ion may be used however, trivalent iron, particularly $Fe_2O_3$, is preferable in terms of the effect. Such a control can be conducted by controlling the purity of the alkali metal salt to be used for the neutralization, or by removal with an ion exchange resin.

(10) Impurities in Acrylic Acid

Among six kinds of impurities, protoanemonine, allyl acrylate, allyl alcohol, aldehyde (particularly furfural), maleic acid, and benzoic acid in acrylic acid, one or more, two or more, three or more, four or more, five or more, and six are in an amount of 0 to 20 ppm, each; preferably 0 to 10 ppm, each; more preferably 0 to 5 ppm, each; furthermore preferably 0 to 3 ppm, each; moreover preferably 0 to 1 ppm, each; and even more preferably ND (Not Detected). Further, the total amount (to acrylic acid amount) of these protoanemonine, allyl acrylate, allyl alcohol, aldehyde, maleic acid, and benzoic acid is preferably 100 ppm or lower, more preferably 0 to 20 ppm, and furthermore preferably 0 to 10 ppm. A preferable method for controlling these trace components and propionic acid amount is use of the acrylic acid derived from a non-fossil raw material as described below.

If the quantity of the above-mentioned impurities is high, the residual monomers and soluble components in the water-absorbent resin may be increase or coloring may be caused. At the same time, in terms of residual monomers, the water amount in acrylic acid is preferably 20 mass % or lower, more preferably 1 mass % or lower, furthermore preferably 0.5 mass % or lower, and even more preferably 0.2 mass % or lower. That is, to prepare the monomer, acrylic acid (water content: 0.2 mass % or lower) is more preferable than an aqueous acrylic acid solution (e.g.; commercialized 80 mass % aqueous solution).

(11) Production Method of Acrylic Acid and Non-Fossil Raw Material

The production method of acrylic acid is not particularly limited in the present invention and, for example, a fossil raw material such as propylene, propane, etc., as a raw material may be oxidized in vapor phase or a non-fossil raw material such as glycerin or the like, particularly, natural material may be oxidized. Such oxidation may be carried out via acrolein production or isolation of acrolein, or acrylic acid may be obtained directly.

In the present state where the water-absorbent resin is consumed and disposed by mass consumption in form of disposable diapers or the like, the raw material is preferable to be renewable and sustainable; that is, it is preferable to obtain the water-absorbent resin and its raw material from a non-fossil raw material. Examples usable as the non-fossil raw material may be 2-hydroxypropionic acid (also known as lactic acid), 3-hydroxypropionic acid, glycerin (preferably, saponified products of plant oils and fats, particularly glycerin from biodiesel). Hydroxypropionic acid may be obtained by chemical oxidation reaction or fermentation method from cellulose and glucose.

One example of such production methods of the water-absorbent resin and the acrylic acid may be a method for obtaining acrylic acid from glycerin obtained from fats and oils and obtaining the water-absorbent resin from the acrylic acid.

That is, from a viewpoint of renewability and sustainability and also from a viewpoint of controllability of propionic acid and phenol, it is preferable to obtain acrylic acid from a raw material (non-fossil raw material) derived from a natural material and it is more preferable to use glycerin or hydroxypropionic acid as a raw material.

Conventionally, it is found that acrylic acid from such a non-fossil raw material, particularly acrylic acid from hydroxypropionic acid and glycerin, contains much acetic acid and propionic acid, and refining of the acrylic acid from the non-fossil raw material for removing acetic acid and propionic acid sacrifices the cost and yield; however, the method of the invention using acrylic acid from the non-fossil raw material and using a prescribed amount of propionic acid as it is without carrying out no excess refining removal of acetic acid and propionic acid for the water-absorbent resin and then carrying out the removal (particularly drying, more particularly drying by azeotropic dewatering) after polymerization or addition of a basic substance is suitable for economically producing the renewable and sustainable water-absorbent resin.

The amount of acrylic acid from a non-fossil raw material is not limited to 100% by mole in the total acrylic acid; but it may be 1% by more or higher, 10% by more or higher, 20% by more or higher, 30% by more or higher, 50% by more or higher, 70% by more or higher, or 90% by more or higher in the total acrylic acid. Further, another acrylic acid (derived from a fossil raw material or another non-fossil raw material) may be used in a range described below, in combination.

(Glycerin)

Methods for producing an acrylic acid-based water-absorbent resin from a non-fossil raw material are exemplified in International Publication Nos. 2006/092271, 2006/092272, 2006/136336, 2008/023039, 2008/023040, 2007/109128, and so forth. These six Patent Literatures do not at all imply the process for producing the water-absorbent resin of the present invention.

Also, methods for producing acrylic acid from a non-fossil raw material are exemplified in International Publication No. 2006/08024, US Patent Application Publication No. 2007/0129570, and International Publication Nos. 2007/119528 and 2007/132926. International Publication No. 2006/08024 discloses the fact that propanal is produced as a by-product at the time of obtaining acrolein from glycerin and acrylic acid containing propionic acid of the invention, particularly, acrylic acid derived from a non-fossil raw material can be obtained easily by oxidizing the acrolein containing propanal.

(Hydroxypropionic Acid)

Methods for obtaining acrylic acid from hydroxypropionic acid by dehydration are exemplified in International Publication Nos. 2002/090312, 2003/08795, 2005/095320, and 2007/106099, US Patent Application Publication No. 2007/219391, International Publication No. 2008/1042958, etc. The un-neutralized hydroxypropionic acid to be dehydrated may be used in form of the acid or its salt (particularly, monovalent salt, more particularly, sodium salt or ammonium salt) and at that time, a solvent may be used or not used. The obtained acrylic acid may be refined by crystallization or distillation and the acrylic acid crystallization method may be layer or dispersion type and carried out continuously or in a batch manner and it is exemplified in, for example, International Publication No. 2008/023039. In addition, it is required to take acrylamide by-product formation into consideration for dehydration of ammonium hydroxypropionate.

Further, methods for obtaining 3-hydroxypropionic acid from glycerin are exemplified in U.S. Pat. No. 6,852,517 and Japanese Patent Application Publication, Tokukai Nos. 2007-082476 and 2005-102533. A method for obtaining 2-hydroxypropionic acid (lactic acid) from glycerin is exemplified in Japanese Patent Application Publication Tokukaihei No. 4-356436. Methods for obtaining 3-hydroxypropionic acid from β-alanine are exemplified in International Publication Nos. 2002/042418 and 2007/042494.

(12) Use of a Plurality of Acrylic Acids

In the present invention, to simply and economically obtain a monomer or acrylic acid containing a prescribed trace component (particularly, propionic acid), it is preferable to produce the monomer by mixing a plurality of acrylic acids (hereinafter referred to a plurality of acrylic acids) with different propionic acid amounts or by different production methods. The object trace component in the present invention may include, preferably an organic compound, particularly preferably a saturated organic carboxylic acid, and furthermore preferably propionic acid. A plurality of acrylic acids are the concept including acrylic acid salts, and mixing of the acrylic acids may be carried out by mixing a plurality of acrylic acids before neutralization and carrying out neutralization further as required, or mixing a plurality of the acrylic acid salts after neutralization from a plurality of acrylic acids, or making one/some acrylic acid be an acrylic acid salt by neutralization and mixing another/the others acrylic acid as it is un-neutralized. That is, to prepare acrylic acid containing propionic acid just in an amount as aimed, it is difficult in terms of the productivity of the acrylic acid and the cost further, in the case the acrylic acid containing an aimed amount of propionic acid itself is not produced (e.g.; one/some acrylic acid contains an excess amount of propionic acid and another/the others contains an insufficient amount), as a preferable production method, a plurality of acrylic acids may be prepared to obtain the acrylic acid or the monomer containing an aimed amount of propionic acid.

In this case, at least acrylic acid derived from a non-fossil raw material is used and a plurality of acrylic acids are used and one or some of the acrylic acids is/are obtained from a non-fossil raw material and another or others is/are obtained from a fossil raw material (FIG. 3). In general, the acrylic acid derived from a non-fossil raw material contains much propionic acid or the like and therefore, it is used preferably. Further, in terms of also adjustment or stabilization of other trace components, not limited to propionic acid (even if propionic acid is in the same level), a plurality of acrylic acids, particularly the acrylic acid from a fossil raw material and the acrylic acid from a non-fossil raw material, are used in combination. As another effect of the invention, use of a plurality of raw material sources of a fossil raw material and a non-fossil raw material for acrylic acids lowers the raw material cost of the water-absorbent resin, and the water-absorbent resin which is optimum from an aspect including the raw materials cost aspect can be obtained. That is, preferably, the acrylic acid derived from a fossil raw material and the acrylic acid derived from a non-fossil raw material are used in combination as described below.

Further, in the case the trace components (preferably an organic compound, particularly preferably a saturated organic carboxylic acid, and furthermore preferably propionic acid) are in amounts below prescribed amounts or aimed amounts or in excess amounts, other different trace components (particularly propionic acid amount) or the acrylic acid produced by a different production method may be properly mixed to give a prescribed amount of the monomer. Since it is often difficult to obtain acrylic acid satisfying propionic acid or the trace components in aimed amounts in terms of the refining cost and production amount, it is preferable that the above-mentioned different acrylic acids are mixed to give the acrylic acid with prescribed amounts of the trace components (e.g. propionic acid) or a water-soluble monomer of the water-absorbent resin using the acrylic acid.

Hereinafter, propionic acid is represented as a trace component for explanation; however, it is preferable to prepare an aimed monomer by using a plurality of acrylic acids containing different amounts of propionic acid in terms of the cost and processes in order to adjust the propionic acid amount in the acrylic acid. That is, a plurality of acrylic acids containing different amounts of propionic acid are produced in different acrylic acid production processes (FIGS. 4, 5, and 6).

Herein, with respect to acrylic acids containing different amounts of propionic acid, one acrylic acid contains propionic acid preferably 1.01 to 1000 times by mass with respect to another acrylic acid does, more preferably 1.05 to 100 times by mass, and furthermore preferably 1.1 to 50 times by mass. Concretely, at least one acrylic acid is preferable to contain 400 ppm or more of propionic acid.

Further, different acrylic acids production processes mean completely different plants and installation sites or different in raw materials, the oxide type (particularly catalysts), refining type (distillation and crystallization) and among them, preferably impurities, particularly propionic acid amounts are made to be different. In the case two kinds of acrylic acids with different purities (impurity amounts) are used, the use ratio (mass ratio) may be determined properly and it is generally in a range of 1:99 to 99:1. It is preferably 10:90 to 90:10, more preferably 20:80 to 80:20, and even more preferably 30:70 to 70:30. In addition, acrylic acid other than the two types may be used in an amount in a range of 0 to 50 mass % in the total acrylic acids, more preferably 0 to 30 mass %, and even more preferably 0 to 10 mass %. The use ratio of two different types or more of acrylic acids may be determined properly on the basis of the costs (raw material costs) of both acrylic acids, supply amounts, trace components (propionic acid and other trace components), etc. and particularly, use of a plurality (particularly two types) of a fossil raw material and a non-fossil raw material can save the raw material cost of the water-absorbent resin. In the case the fossil raw material and the non-fossil raw material are used in combination, the ratio can be measured by quantitatively measuring 14C in the monomer and in the water-absorbent resin.

The effect of propionic acid can be caused at the time of polymerization of the monomer; however even if propionic acid is added to the water-absorbent resin after polymerization, not only the effect of improving the water absorbency cannot be observed but also a problem of malodor is caused. Further, in the case propionic acid and acetic acid is too much, it is difficult to remove them after polymerization or during polymerization and particularly difficult to remove them during drying and a problem of malodor due to residual may be caused in some cases and accordingly, it is preferable to use propionic acid and acetic acid in the above-mentioned ranges from a viewpoint of the balance with malodor. That is, in the present invention, acrylic acids to be mixed contain organic or inorganic (particularly organic) trace components such as propionic acid or the like in an amount of preferably 1 mass % or lower, more preferably 0.5 mass % or lower, furthermore preferably 0.2 mass % or lower, and even more preferably 0.1 mass % or lower and the amounts of the trace components are preferably different from each other. The lower limit of the trace amounts is 0.0001 mass % and further preferably about 0.001 mass % and mixing of a plurality of acrylic acids leads to the advantage of use of acrylic acids with no need of excess refining. Particularly, in the case of the acrylic acid derived from a non-fossil raw material, the propionic acid amount is sometimes excess beyond the aimed amount and excess refining is made no need by the method of the present invention.

Acrylic acids with different propionic acid amounts or produced by different production methods may be mixed by continuous mixing using a pipeline or by mixing in a tank. For example, acrylic acid containing a comparatively large amount of propionic acid can be obtained by employing, as a refining method, distillation rather than crystallization or can be derived from a non-fossil raw material rather than a fossil raw material and it is preferable to mix these acrylic acids for obtaining prescribed acrylic acid or monomer. Further, production processes of a plurality of acrylic acids and production processes of the water-absorbent resin may be carried out in the same site or in different sites or by different manufacturers. In the case of different sites or different manufacturers, the acrylic acids may be purchased or transported properly.

Particularly, the content of propionic acid can be changed easily by changing especially the raw material. In such a method, in terms of adjustment of the trace components and risk hedge of raw materials, one or some of a plurality of acrylic acids containing different amounts of propionic acid can be obtained from a non-fossil raw material (raw material derived from a natural substance) and another or others is/are obtained from a fossil raw material. In that case, acrylic acid from a fossil raw material and acrylic acid from a non-fossil raw material are used together in the above ratio.

As described in (11) and (12), the second and the third production processes of the invention provide the following.

The invention provides a process for producing a polyacrylic acid (salt)-based water-absorbent resin involving a step of preparing a monomer from acrylic acid, a step of polymerizing the monomer, and a step of drying the obtained hydrogel, in which the monomer is prepared by mixing a plurality of acrylic acids containing different amounts of propionic acids and/or by mixing a plurality of acrylic acids obtained in different production processes. Especially, in terms of adjustment of the trace components and risk hedge of raw materials, the processes are preferable to use a plurality of raw material sources of a fossil raw material and a non-fossil raw material as the acrylic acids.

The mixing ratio in the above-mentioned production process may be constant or changed over time and/or the water-absorbent resin. In the above-mentioned production process using a plurality of acrylic acids, since the purity of the monomer (trace components) can be controlled to be constant with no need of excess refining of acrylic acids, the acrylic acids can be used economically and at high yield and the water-absorbent resin with high physical properties can be economically and stably obtained. At that time, a plurality of acrylic acids to be mixed may be properly measured and particularly, the above-mentioned trace components (e.g., the above-mentioned description (12), acetic acid, propionic acid, etc.) are measured to determine the optimum mixing ratio.

(13) Phenol

In the present invention, it is found that phenol is effective for improvement of early-phase coloring of the water-absorbent resin.

That is, in the present invention, the monomer contains phenol (rational formula: $C_6H_5OH$). The content of phenol is preferably 0.01 to 5000 ppm, more preferably 0.01 to 2500 ppm, and even more preferably 0.01 to 400 ppm in the monomer (solid matter).

In addition, methoxyphenol exemplified in International Publication No. 2003/051940 and sterically hindered phenol exemplified in International Publication No. 2003/53482 can be used as a polymerization inhibitor for acrylic acid and increase of methoxyphenol or the like causes coloring of the water-absorbent resin, whereas phenol is used in this application to prevent the coloring.

Since solubility of phenol in water is slightly low (8.4 g/100 ml, 20° C.), it is preferable to previously add a prescribed amount of phenol in acrylic acid with high solubility. The increase of phenol exhibits the effect on early-phase coloring and also provides antibacterial and deodorization properties in some cases; however, use in a large amount may lower the effect of preventing coloring over time.

Use of phenol gives the water-absorbent resin with a white color even in disadvantageous conditions for coloring like the cases of carrying out high density polymerization, high temperature initiation polymerization, high temperature drying, high temperature surface-crosslinking, etc., without any problem of deterioration of physical properties of the water-absorbent resin and decrease of the stability of the monomer (gelatification or partial gelatification to occur prior to the polymerization causes clogging of a pipe or a tank).

To add a prescribed amount of phenol to the acrylic acid, phenol may be added to sufficiently refined acrylic acid or phenol is produced as a by-product in the middle step of producing acrylic acid and thereafter phenol is oxidized (oxygen-oxidized) or removed by separation-removal to adjust the amount to be a prescribed amount. A method for producing the phenol-containing acrylic acid means the acrylic acid derived from the above-mentioned raw material derived from as a natural substance, more preferably derived from glycerin as the natural substance. A sustainable and renewable polyacrylic acid-based water-absorbent resin derived from natural glycerin can be produced from such acrylic acid.

(14) Hydroxyacetone

In the present invention, it is found that hydroxyacetone causes a negative effect on coloring of the water-absorbent resin over time and also causes a negative effect on the stability of the monomer.

That is, the amount of hydroxyacetone ($CH_3COCH_2OH$: also known as acetol) as an impurity is preferably 0 to 300 ppm in the acrylic acid of the present invention. The upper limit of hydroxyacetone is preferably 200 ppm, 100 ppm, 50 ppm, 20 ppm, 10 ppm, 5 ppm, 1 ppm, and 0.1 ppm in this order. In addition, existence in a prescribed amount tends to improve the early-phase coloring (particularly WB) and therefore, it is preferable.

Conventionally, if the polymerization initiating temperature or concentration is increased or polymerization scale is expanded for physical properties and productivity, or the polymerization inhibitor is decreased for preventing coloring, partial gelatinization of the monomer is caused; however, in the present invention, it is found that the cause thereof is because hydroxyacetone decreases the stability of the monomer. Additionally, hydroxyacetone tends to improve the early-phase coloring, it is preferable to contain hydroxyacetone in an amount of about 0.1 to 10 ppm in the monomer.

(15) Control Method of Phenol and Hydroxyacetone

Phenol (boiling point 182° C., melting point 43° C.) and hydroxyacetone (boiling point 146° C., melting point −6° C.) in acrylic acid (boiling point 142° C., melting point 12° C.) are controlled by crystallization or distillation in the acrylic acid on the basis of differences of the boiling points, melting points, and solubility, or phenol and hydroxyacetone, which are trace components, may be controlled by addition in prescribed amounts or by oxidizing them with acrolein in the acrylic acid production process. For example, a method of International Publication No. 2008/05364 is preferably employed for the removal or control.

The control method disclosed in the patent (particularly, paragraphs [0015] to [0041]) is entirely incorporated in the present application. The production process of desirable acrylic acid from a natural substance is exemplified in the patent, and the method is a technique for removing phenol and hydroxyacetone from the acrylic acid but no technique for producing the water-absorbent resin in specified steps by adding prescribed amounts of phenol and hydroxyacetone is disclosed.

That is, as one example of a process for producing acrylic acid in addition to the patent, described is a process for producing acrylic acid involving a refining step of removing phenol and/or 1-hydroxyacetone from an acrolein-containing composition exemplified in the patent and an oxidation step of producing acrylic acid by oxidizing acrolein in the acrolein-containing composition after the refining step. Preferably, the process involves a dehydration step of producing acrolein by dehydrating glycerin before the refining step. Further preferably, glycerin is dehydrated in vapor phase in the dehydration step.

(16) Control Method of Hydroxypropionic Acid

Hydroxypropionic acid may be separated by distillation or the like based on the difference of boiling points of hydroxypropionic acid and acrylic acid and preferably subjected to crystallization.

The amount of hydroxypropionic acid in the monomer at the time of polymerization, particularly in the monomer after neutralization is preferably 2000 ppm or lower, more preferably 1000 ppm or lower, furthermore preferably 500 ppm or lower, moreover preferably 300 ppm or lower, and even more preferably 100 ppm or lower. Excess refining leads to increase of the cost and a small amount of the residual slightly causes a negative effect on the residual monomer and therefore, the lower limit is preferably 1 ppm and particularly sufficiently about 10 ppm.

To lower hydroxypropionic acid, it is preferable to lower hydroxypropionic acid in acrylic acid and at the same time to suppress conversion reaction to 3-hydroxypropionic acid by Michel addition to the acrylic acid during neutralization or after neutralization.

Therefore, acrylic acid to be used for neutralization is preferable to be in non-aqueous state (water content of 20 mass % or lower, more preferably 1 mass % or lower). In the neutralization step thereafter, after refining, particularly refining by distillation, the acrylic acid is used within a time as short as possible, for example, within 72 hours, preferably within 24 hours, more preferably within 12 hours, and even more preferably within 6 hours for the neutralization or preparation of a water-soluble unsaturated monomer. Further, in the neutralization step, the acrylic acid is put at least temporarily in the state that the neutralization ratio exceeds 100% by mole. Next, the monomer is prepared using the acrylic acid and the obtained acrylic acid salt and other monomers as required. Finally, the obtained monomer may be polymerized within, for example 24 hours, preferably within 12 hours, more preferably within 6 hours, and even more preferably within 2 hours after completion of the monomer preparation. Further, the acrylic acid after distillation refining is preferable to be kept at a temperature as low as possible, for example, 30° C. or lower, preferably from a solidifying point to 25° C. until the acrylic acid is used for the neutralization or preparation of the monomer. The neutralization step is preferably carried out at a low temperature, for example, 70° C. or lower and particularly 50° C. or lower within a short time, preferably within 4 hours in the presence of a polymerization inhibitor. In the case the acrylic acid is kept for a relatively long time after distillation, the acrylic acid is better to be kept in non-aqueous state. Further, the monomer on completion of the preparation should be preserved at its solidification point or higher to 40° C. or lower, preferably 0 to 30° C. If out of the conditions, 3-hydroxypropionic acid and residual monomer tend to be increased and therefore, it should be careful.

In National Publication No. 2008/023039, a technique for obtaining a water-absorbent resin after producing acrylic acid from 3-hydroxypropionic acid by dehydration and crystallization is disclosed and in this technique an aqueous solution of 62 mass % of refined acrylic acid after crystallization is obtained; however there is no description of neutralization temperature or time and therefore, increase of 3-hydroxypropionic acid in the neutralized monomer cannot be controlled. In the present invention, the refined acrylic acid is dehydrated, and further the time and temperature until neutralization and the time after neutralization are controlled to inevitably suppress 3-hydroxypropionic acid in the monomer to 2000 ppm or lower at the time of polymerization.

(17) Concentration of Monomer

Monomers may be polymerized generally in an aqueous solution. The monomer concentration in the aqueous solution is generally 10 to 90 mass %, preferably 20 to 80 mass %, more preferably 30 to 70 mass %, and even more preferably 40 to 60 mass %. Further, when the monomer is polymerized in an aqueous solution, a surfactant, a polyacrylic acid (salt), and a polymer compound such as starch and polyvinyl alcohol, various kinds of chelating agents, various kinds of additives may be added and used in combination in an amount of 0 to 30 mass % (to the monomer).

(18) Other Monomer Components

Further, the aqueous monomer solution may contain a water-soluble resin or a water-absorbent resin such as starch, polyacrylic acid (salt), polyethyleneimine or the like in an amount of, for example 0 to 50 mass %, preferably 0 to 20 mass %, furthermore preferably 0 to 10 mass %, and even more preferably 0 to 3 mass % to the monomer. Various kinds of foaming agents (carbonates, azo compounds, foams, etc.), surfactants, and additives described below may be added in an amount of, for example 0 to 5 mass % and preferably 0 to 1 mass % to improve the various physical properties of the water-absorbent resin and a granular water-absorbent agent.

The water-absorbent resin may contain a chelating agent, hydroxycarboxylic acid such as lactic acid, and a reducing inorganic salt in an amount of preferably 10 to 5000 ppm, more preferably 10 to 1000 ppm, furthermore preferably 50 to 1000 ppm, and even more preferably 100 to 1000 ppm. It is dispensable to use preferably a chelating agent.

Hereinafter a chelating agent, a hydroxycarboxylic acid, and a reducing inorganic salt usable are described in (19) to (21).

(19) Chelating Agent (Preferably Water-Soluble Organic Chelating Agent)

In case the aim of the present invention is to further improve, for example, color stability (the color stability in the case of storing the granular water-absorbent agent in high temperature and high humidity condition for a long duration) and the anti-urine property (prevention of gel deterioration) of the granular water-absorbent agent of the present invention (the final product obtained from the water-absorbent resin), a chelating agent is preferably used.

In terms of the effect, the chelating agent is preferably a water-soluble organic chelating agent and more preferably a non-polymeric compound organic chelating agent having nitrogen atom or phosphorus atom and more preferably an aminopolycarboxylic acid type chelating agent or an amionpolyphosphoric acid type chelating agent. Due to the effect on the polymerization and physical properties to be obtained, a non-polymeric organic compound with a weight average molecular weight of 5000 or lower is preferable and the molecular weight is more preferably 100 to 1000.

Among the above-mentioned compounds, compounds having nitrogen atom or phosphorus atom are preferable. Especially preferable are aminopolycarboxylic acids (salts) having two or more and further three or more of carboxyl groups, more preferably 3 to 100 carboxyl groups, even more preferably 3 to 20 carboxyl groups, and furthermore preferably 3 to 10 carboxyl groups and organic phosphoric acid (salt) compounds having phosphoric acid groups. Particularly, organic polyphosphoric acid compounds and aminopolyphosphoric compounds having amino groups are preferable.

Examples of the aminopolycarboxylic acids (salts) having two or more carboxyl groups are aminocarboxylic acid type metal chelating agents such as iminodiacetic acid, hydroxyethyliminodiacetic acid, nitrilotriacetic acid, nitrilotripropionic acid, ethylenediamine tetraacetic acid, hydroxyethylenediamine triacetic acid, hexamethylenediamine tetraacetic acid, diethylenetriamine pentaacetic acid, triethylenetetramine hexaacetic acid, and their salts.

Examples of the organic polyphosphoric acid compounds or aminopolyphosphoric acid compounds having three or more phosphoric acid groups in a molecule are ethylenediamine-N,N'-di(methylenephosphinic acid), ethylenediamine tetra(methylenephosphinic acid), polymethylenediamine tetra(methylenephosphonic acid), diethylenetriamine penta(methylenephosphonic acid), 1-hydroxyethylidene diphosphonic acid, and their salts.

(20) Hydroxycarboxylic Acid Compound (Hydroxypolycarboxylic Acid)

Further, for the color stability effect, hydroxycarboxylic acids such as citric acid (salt), malic acid (salt), etc., and particularly non-polymeric hydroxycarboxylic acids, non-polymeric hydroxypolycarboxylic acids, etc. exemplified in International Publication No. 2008/026772 may be used in form of monomers or their polymers.

(21) Reducing Inorganic Salt

Further, for the color stability effect and anti-urine property, the reducing inorganic salts exemplified in US Patent Application Publication No. 2006/88115 may be used.

(22) Polymerization Step (Crosslinking Polymerization Step)

In terms of the capability and easiness of polymerization control, a polymerization method is generally carried out by aqueous solution polymerization or reversed phase suspension polymerization, particularly, the aqueous solution polymerization and further preferably continuous aqueous solution polymerization, which are conventionally difficult to control polymerization or improve the coloring. An especially preferable method is a continuous polymerization method for producing the water-absorbent resin in a huge scale of 0.5 t/hr or higher, further 1 t/hr or higher, furthermore 5 t/hr or higher, and still further 10 t/hr or higher by polymerization of an aqueous monomer solution in one line. Consequently, the preferable continuous polymerization may include methods described as continuous kneader polymerization (e.g. U.S. Pat. Nos. 6,987,151 and 6,70,141), continuous belt polymerization (e.g. U.S. Pat. Nos. 4,893,999 and 6,241,928, and US Patent Application Publication No. 2005/215734).

In addition, in the continuous polymerization, polymerization at a high temperature starting (monomer at 30° C. or higher, 35° C. or higher, further 40° C. or higher, and particularly 50° C. or higher: the upper limit is the boiling point) in a high monomer concentration (30 mass % or higher, 35 mass % or higher, further 40 mass % or higher, and particularly 45 mass % or higher: the upper limit is the saturated concentration) can be exemplified as one preferable example. The highest temperature for the polymerization is preferably 100 to 150° C. and more preferably 105 to 130° C. from the physical aspect. The unsaturated carboxylic acid (propionic acid) described below can be more efficiently removed during the polymerization or after polymerization by such high temperature polymerization or high concentration polymerization and it is preferable also from a viewpoint of decrease of malodor (acid smell) of the water-absorbent resin to be obtained.

The monomer stability is excellent in the present invention and the water-absorbent resin with white color can be obtained even by the polymerization in such a high concentration and at such a high temperature and therefore, it is easy to remove propionic acid and thus the effect is significantly exhibited in such conditions. Preferable examples of high temperature initiating polymerization are described in U.S. Pat. Nos. 6,906,159 and 7,091,253 and in the present invention, the monomer stability before polymerization is excellent and therefore, production in an industrial scale is made easy.

The polymerization can be carried out in atmospheric air; however it is preferable for coloring improvement to carry out the polymerization in an inert gas atmosphere of nitrogen or argon (e.g., oxygen concentration of 1% by volume or lower) and also, the monomer is preferable to be used for polymerization after the dissolved oxygen in the solution containing the monomer is sufficiently replaced with an inert gas (e.g., less than 1 ppm of oxygen). Even if such degassing is carried out, the monomer is excellent in the stability and therefore gelatinization before the polymerization does not occur and the water-absorbent resin with higher physical properties and high whiteness can be obtained.

(23) Polymerization Initiator

A polymerization initiator to be used for the present invention can be selected properly in accordance with the polymerization mode. Examples of the polymerization initiator may include a photodecomposition type polymerization initiator, a heat decomposition type polymerization initiator, and a redox type polymerization initiator. The amount of the polymerization initiator may be 0.0001 to 1% by mole and preferably 0.001 to 0.5% by mole to the monomer.

Increase of the polymerization initiator may possibly cause coloring and in the case the amount is low, it results in increase of the residual monomer. Further, in the case of a conventional coloring improver, it sometimes causes a negative effect on the polymerization; however, in the polymerization by the method of the invention, the coloring can be improved without causing any negative effect and therefore, it is preferable.

Examples of the photodecomposition type polymerization initiator may include benzoin derivatives, benzyl derivatives, acetophenone derivatives, benzophenone derivatives, and azo compounds. Examples of the heat decomposition type polymerization initiator may include persulfuric acid salts (sodium persulfate, potassium persulfate, and ammonium persulfate), peroxides (hydrogen peroxide, tert-butyl peroxide, methyl ethyl ketone peroxide), azo compounds (2,2'-azobis (2-amindinopropane)dihydrochloride, 2,2'-azobis[2-(2-imidazolin-2-yl)propane]dihydrochloride, etc.).

Examples of the redox type polymerization initiator may include combination systems of the above-mentioned persulfuric acid salts and peroxides in combination with reducing compounds such as L-ascorbic acid and sodium hydrogen sulfite. Further, combination use of a photodecomposition type initiator and a heat decomposition type polymerization initiator can also be exemplified as a preferable embodiment.

(24) Gel Crushing Step

The hydrogel type crosslinked polymer obtained by the polymerization may be dried directly; however, it may be gel-crushed to be granular by a crusher (a kneader, a meat chopper, etc.) during the polymerization or after the polymerization, as required.

From the physical property aspect, regarding the temperature of the hydrogel at the time of gel crushing, the hydrogen is kept or heated preferably at 40 to 95° C. and more preferably 50 to 80° C. The resin solid matter of the hydrogel is not particularly limited; however, from the physical property aspect, it is preferably 10 to 70 mass %, more preferably 15 to 65 mass %, and even more preferably 30 to 55 mass %. It is optional to add water, a polyalcohol, a mixed liquid of water and a polyalcohol, a solution obtained by dissolving a polyvalent metal in water, or their vapor, or the like.

(25) Drying Step

In order to lower the residual monomer and prevent gel deterioration (anti-urine property) and yellowing in the polymerization initiator, a time span between the polymerization and a drying step via the gel crushing step carried out as required is short. That is, the drying step of the hydrogel type crosslinked polymer is started (loaded to a dryer) preferably within 1 hour, more preferably within 0.5 hours, and even more preferably within 0.1 hours. Further, to decrease the residual monomer and accomplish low coloring, the temperature of the hydrogel type crosslinked polymer from completion of the polymerization to starting of the drying is controlled preferably at 50 to 80° C. and more preferably at 60 to 70° C.

The drying step provides a dried product having a resin content in amount, which is calculated from a drying loss of the polymer (drying of 1 g powder or particles at 180° C. for 3 hours) in an amount controlled to be preferably 80 mass % or higher, more preferably 85 to 99 mass %, furthermore preferably 90 to 98 mass %, and even more preferably 92 to 97 mass %. The drying temperature is not particularly limited; however it is preferably in a range of 100 to 300° C. and more preferably in a range of 150 to 250° C. To satisfy both of the high physical properties and whiteness, it is most preferably that the drying temperature is 165 to 230° C. and the drying time is within 50 minutes. If the temperature or the time is out of the above-mentioned range, it may possibly result in decrease of the water absorbency (CRC), increase of soluble matters (extractables), and deterioration of whiteness index.

A drying method may be a continuous or batch type method and one or more of various methods such as heat drying, hot-air drying, vacuum drying, infrared drying, microwave drying, drying by a drum drier, azeotropic dehydration with a hydrophobic organic solvent, high humidity drying using high temperature steam, and so forth can be employed and it is preferably hot-air drying with a gas with a dew point of preferably 40 to 100° C. and more preferably 50 to 90° C. A variety of band dryers can be preferably employed for the hot-air drying. Further, another preferable drying methods other than the hot-air drying may be azeotropic dehydration in a hydrophobic organic solvent described below since it can be carried out at a low temperature and has high removal efficiency of propionic acid. That is, from a viewpoint of removal of the saturated organic carboxylic acid described below, hot-air drying or azeotropic dehydration is preferable and azeotropic dehydration is more preferable.

(26) Removal of Propionic Acid from Water-Absorbent Resin

In the present invention, propionic acid (boiling point 141° C.; 760 mmHg) is enough to exist merely in the polymerization and may possibly become a cause of acid smell after polymerization. Further, a saturated organic carboxylic acid such as acetic acid and propionic acid has a chemical structure and a boiling point similar and close to those of acrylic acid (boiling point 141° C.: same), separation refining by crystallization and distillation is difficult and it is accompanied with problems of production cost increase and decrease of yield of acrylic acid. Therefore, utilizing that a saturated organic carboxylic acid is not polymerized, the saturated organic carboxylic acid is preferably removed from the polyacrylic acid (salt) during polymerization or after polymerization, particularly after polymerization.

In the above-mentioned production process involving removal of propionic acid after polymerization, no excess refining is needed for acrylic acid and therefore, economical raw material acrylic acid can be used and consequently, the water-absorbent resin with high physical properties and free from malodor can be obtained economically and stably.

Accordingly, propionic acid at the time of polymerization may be removed from the water-absorbent resin during the polymerization (particularly the latter half of the polymerization and more particularly at 90% or more of the polymerization degree) or after the polymerization as required and, for example, 5 mass % or higher, preferably 15 mass % or higher, more preferably 30 mass % or higher, furthermore preferably 40 mass % or higher, moreover preferably 50 mass % or higher, and even more preferably 70 mass % or higher of the propionic acid to be used is removed. The saturated organic carboxylic acid amount in the water-absorbent resin obtained in such a manner, particularly the total of acetic acid and propionic acid, and more particularly the propionic acid amount is preferably 2 mass % or lower, more preferably 2000 ppm or lower, furthermore preferably 1500 ppm or lower, and even more preferably 1000 ppm or lower in terms of malodor. A small amount of the residue may not cause any malodor problem or propionic acid may exhibit an antibacterial property in some cases and thus in terms of the removal cost, the lower limit of propionic acid is sufficiently about 10 ppm and further about 100 ppm. In terms of malodor of the water-absorbent resin, the residual propionic acid is preferably a salt type (propionic acid salt, particularly monovalent salt) rather than an acid type and consequently, the water-absorbent resin can be neutralized to an extent of the above-mentioned neutralization ratio and preferably to a prescribed ratio or higher.

A removal method may be extraction, washing, and evaporation, and preferably evaporation, and may be heating at a temperature equal to or higher than the boiling temperature (141° C.) in normal pressure or reduced pressure. A heating method may include a drying step or a surface crosslinking step and particularly preferably heating for a prescribed duration and at a prescribed temperature or higher in hydrated state. Further, at the time of removal of propionic acid, it is also preferable to remove, particularly evaporate, an organic acid such as acetic acid, acrylic acid, etc. in an amount within the above-mentioned range. Moreover, various kinds, e.g. water and hydrophilic and hydrophobic organic solvents, may be used for extraction and washing. Even more, in the case of azeotropic dehydration in the hydrophobic organic solvent described below, the saturated organic carboxylic acid, particularly propionic acid, can be efficiently removed even by heating at a temperature lower than the boiling point of propionic acid and thus it is preferable.

The heating conditions may be adjusted on the basis of heating time in the above-mentioned drying step or surface crosslinking, and the heating may be carried out preferably at 150 to 250° C., more preferably at 165 to 230° C. for 10 minutes or longer. It is more preferably 15 minutes to 2 hours and even more preferably 20 minutes to 1 hour. If the heating is carried out in the above-mentioned conditions, hydrogel with a water content of preferably 3 to 80 mass % and particularly preferably 5 to 70 mass % can be obtained. The heating treatment of the hydrogel is preferably hot-air drying in an air volume of hot air volume of 0.1 to 5 m/sec, more preferably 0.5 to 3 m/sec in a range of the above-mentioned dew point, that is, the dew point of hot air preferably in a range of 40 to 100° C. and more preferably in a range of 50 to 90° C. The azeotropic dehydration in the hydrophobic organic solvent, which is another suitable drying means, will be described below.

In the case neither water nor air blow is available, removal of propionic acid may be insufficient even by heating, and the obtained water-absorbent resin may sometimes emit acid smell. In the case of a low dew point also, the removal tends to be insufficient.

Propionic acid removed from the various drying steps or surface-crosslinking step exemplified in (26) may be collected by cooling condensation or trapping with water or an aqueous alkaline solution in form of an aqueous propionic acid (salt) solution together with other volatile compounds (e.g.; acrylic acid (boiling point 141° C.), acetic acid (boiling point 118° C.). The collected volatile compounds may be reused for polymerization after being refined as required or may be discarded by combustion or biodegradation.

Further, it is found that azeotropic dehydration in a hydrophobic organic solvent is preferable for removal of propionic acid after polymerization. A preferable removal method to be applied may be azeotropic dehydration which is employed for drying in a reversed phase suspension polymerization. Further, the present invention can be suitably applicable for reversed phase suspension polymerization. That is, in the process for producing a water-absorbent resin, the present invention provides a process for producing a water-absorbent resin characterized in that the above-mentioned water-soluble unsaturated monomer contains a prescribed amount of propionic acid and the propionic acid is removed by azeotropic dehydration, and as the polymerization method at that time, aqueous solution polymerization or reversed phase suspension polymerization, preferably reversed phase suspension polymerization is employed. A hydrophobic organic solvent to be employed is generally a low boiling point hydrophobic organic solvent with a boiling point of about 60 to 140° C. and further 80 to 120° C. and in the present invention, it is found that propionic acid can be extremely efficiently removed by polymerization in a solvent with a low boiling point, particularly a solvent with a boiling point lower than the boiling point (141° C.) of propionic acid or by azeotropic dehydration (the upper limit of heating temperature is boiling point of the solvent).

The reversed phase suspension polymerization is a polymerization method involving suspending the aqueous monomer solution in granular state with a mass average particle diameter of 0.1 to 1 mm in a hydrophobic organic solvent and is advantageous to obtain gel particles with a product particle diameter simultaneously with polymerization and the polymerization is described in, for example, US patents such as U.S. Pat. Nos. 4,093,776, 4,367,323, 4,446,261, 4,683,274, 5,244,735, etc. In the present invention, a dispersant selected from surfactants and protection colloids may be dissolved or dispersed in the aqueous solution of the monomer, as required. In the case particularly, the reversed phase suspension polymerization is employed in the present invention, addition of the dispersant to the aqueous monomer solution gives the finally obtained water-absorbent resin in a narrowed particle diameter distribution since the monomer or the granular state polymer is dispersed more evenly in the hydrophobic organic solvent.

Examples of the surfactants may be (polyoxyethylene) phosphoric acid esters such as polyoxyethylene octyl phenyl ether phosphoric acid ester and polyoxyethylene tridecyl ether phosphoric acid ester (both produced by Dai-Ichi Kogyo Seiyaku Co., Ltd.: Plysurf (registered trade name)); nonionic type surfactants such as polyoxyethylene alkyl ethers, polyoxyethylene alkyl phenol ethers, polyoxyethylene alkyl esters, sorbitan fatty acid esters, polyoxyethylene sorbitan fatty acid esters, sucrose fatty acid esters, etc.; and anionic surfactants such as higher alcohol sulfuric acid esters, alkylnaphthalenesulfonic acid salts, alkyl polyoxyethylene sulfate salts, dialkylsulfosuccinic acid, and one or more surfactants among them may be separately selected and used and the surfactants may be added collectively or dividedly to the polymerization system. Further, examples of the polymer protection colloids may include ethyl cellulose, ethyl hydroxy cellulose, maleic acid (anhydride)-ethylene copolymers, maleic acid (anhydride)-butadiene copolymers, etc. Especially, fatty acid ester type surfactants, further nonionic type surfactants or anionic surfactants with HLB of 8 or higher, are preferable. The use amount of the surfactant or dispersant is generally 0.05 to 10 mass % and preferably 0.5 to 5 mass % to the monomer.

The hydrophobic organic solvent to be used as a medium for the reversed phase suspension polymerization in the present invention is not particularly limited if it is not mixed with the aqueous monomer solution and forms two phases and may include, for example, aliphatic hydrocarbons such as n-pentane, n-hexane, n-heptane, n-octane, etc.; alicyclic hydrocarbons optionally having substituent groups such as cyclohexane, cyclooctane, methylcyclohexane, decalin, etc.; aromatic hydrocarbons optionally having substituent groups such as benzene, ethylbenzene, toluene, xylene, etc., and one of these compounds or a mixture of two or more of these compounds may be used. Particularly preferable one is n-hexane (boiling point 69° C.), n-heptane (boiling point 98° C.), cyclohexane (boiling point 81° C.), methylcyclohexane (boiling point 110° C.), toluene (boiling point 81° C.), or xylene (boiling point 139° C.). The mass ratio of the hydrophobic organic solvent and the aqueous monomer solution is preferably 3:2 to 4:1. The dispersant or the hydrophobic organic solvent may be added separately during the polymerization or after polymerization.

The monomer is collectively or dividedly dispersed in the solvent and the solvent in which the monomer or its polymer is dispersed may be heated in a range of 40 to 90° C. and more preferably 50 to 80° C. for a duration in a range of 0.5 to 10 hours and more preferably 1 to 5 hours to carry out polymerization. The mass average particle diameter at the time of dispersion is generally in a range of 10 to 2000 μm and preferably in a range of 100 to 1000 μm in terms of physical properties, and more preferably in a range of 200 to 600 μm, and the contents of fine powders with 850 μm or larger and with 150 μm or smaller are preferably lower, and more concretely, 10 mass % or lower and 5 mass % or lower for the respective powders. They may be properly adjusted by types and amounts of the dispersant and solvent, the agitation power, and granulation.

The polymerization can be moderately controlled by carrying out the reversed phase suspension polymerization in the present invention. Further, as a significant advantage of the reversed phase suspension polymerization, as compared with common hot-air drying, in the case of employing drying at a low temperature (the upper limit of heating is boiling point of the solvent) by azeotropic dehydration in the hydrophobic organic solvent, removal of propionic acid after polymerization is easy in spite of low temperature drying (drying in the low boiling point organic solvent). Further, from a viewpoint of propionic acid removal, employment of aqueous solution polymerization and also employment of the above-mentioned azeotropic dehydration are preferable. In that case, the above-mentioned surfactant and dispersant are used as required, to disperse the hydrogel-containing polymer after the aqueous solution polymerization in the above-mentioned hydrophobic organic solvent, and then azeotropic dehydration is carried out in the hydrophobic organic solvent. The solid matter after the drying is within the above-mentioned range and the water-absorbent resin is separated from the hydrophobic solvent by filtration after the azeotropic dehydration and the hydrophobic organic solvent may be further dried out if necessary. Further, the hydrophobic organic solvent containing propionic acid and the surfactant may be distilled and recycled. Surface crosslinking is arbitrary and may be carried out in a dispersion system of the hydrophobic organic solvent or in a powder system after filtration.

(27) Crushing or Classifying Step (Particle Size Adjustment after Drying)

After the step of drying the above-mentioned hydrogel-containing crosslinked polymer, the particle size may be adjusted after the drying if necessary, and the polymer is preferably made to have a specified particle size to improve the physical properties by surface crosslinking described below. The particle size can be adjusted properly by polymerization (particularly reversed phase suspension polymerization), crushing, classification, granulation, and fine powder recovery. Hereinafter, the particle size is a particle size defined by a standard sieve (JIS Z8801-1 (2000)).

The mass average particle diameter (D50) of the dried particles before surface crosslinking is adjusted to be 200 to 600 μm, preferably 200 to 550 μm, more preferably 250 to 500 μm, and even more preferably 350 to 450 μm. It is more preferable as the particles smaller than 150 μm are less, and the particles are adjusted in a range of generally 0 to 5 mass %, preferably 0 to 3 mass %, and more preferably 0 to 1 mass %. Further, it is more preferable as the particles bigger than 850 μm are less, and the particles are adjusted in a range of generally 0 to 5 mass %, preferably 0 to 3 mass %, and more preferably 0 to 1 mass %. The logarithmic standard deviation (σζ) of the particle size distribution is preferably 0.20 to 0.40, more preferably 0.27 to 0.37, and even more preferably 0.25 to 0.35. Its measurement method may be a method described in, for example, International Publication No. 2004/69915 and a method described in EDANA-ERT 420.2-02. The particle diameter is preferably applied also to the finally obtained water-absorbent resin after surface crosslinking.

In general if the particle size distribution is narrowed, that is, the upper and lower limits of the particle size are controlled to be narrow, the color becomes noticeable; however the present invention is free from such color issue and is preferable. Accordingly, in the present invention, it is preferable to carry out a classification step to give the ratio of particles with 150 to 850 μm of 95 mass % or more. More preferably, a classification step to give the ratio of 98 mass % or higher (upper limit 100 mass %) is included. Such particle size distribution is preferably applied also to the finally obtained water-absorbent resin after the surface crosslinking.

(28) Surface Crosslinking Step

In the present invention, the surface crosslinking step for the water-absorbent resin particles preferably after drying is further included. In the production process of the present invention, the water-absorbent resin with less coloring and less increase of residual monomers in the surface crosslinking step and more white and lower residual monomers can be obtained. Consequently, the surface crosslinking step is preferably employed for the water-absorbent resin to be subjected to surface crosslinking, particularly the water-absorbent resin to be subjected to high temperature surface crosslinking.

(Covalent Binding Surface Crosslinking Agent)

Examples of a surface crosslinking agent to be employed in the present invention may include various organic or inorganic crosslinking agents, and organic surface crosslinking agents are preferably used. Preferable examples to be used as the surface crosslinking agent are polyalcohol compounds, epoxy compounds, polyamine compounds and their condensation products with haloepoxy compounds, oxazoline compounds (mono-, di-, or poly-)oxazolidinone compounds, and alkylene carbonate compounds and dehydration esterification reactive crosslinking agents containing polyalcohol compounds, alkylene carbonate compounds, and oxazolidinone compounds, which require a particularly high temperature reaction, are usable.

More concretely, examples are compounds exemplified in U.S. Pat. Nos. 6,228,930, 6,071,976, and 6,254,990. Examples are polyalcohol compounds such as mono-, di-, tri-, or tetra-propylene glycol, 1,3-propanediol, glycerin, 1,4-butanediol, 1,3-butanediol, 1,5-pentanediol, 1,6-hexanediol, sorbitol, etc.; epoxy compounds such as ethylene glycol diglycidyl ether, glycidol, etc.; alkylene carbonate compounds such as ethylene carbonate; oxetane compounds; and cyclic urea compounds such as 2-imidazolidinone.

(Ion-Bonding Surface Crosslinking Agent)

Further, other than the above-mentioned organic surface crosslinking agent, an inorganic surface crosslinking agent may be used to improve the liquid permeability potential or the like. Examples usable as the inorganic surface crosslinking agent may include divalent or higher, preferably, trivalent to tetravalent polyvalent metal salts (organic salts and inorganic salts) and hydroxides. Polyvalent metals to be used are aluminum, zirconium, etc., and their salts are aluminum lactate and aluminum sulfate. These inorganic surface crosslinking agents may be used simultaneously with or separately from the organic surface crosslinking agent. The surface crosslinking with polyvalent metals is exemplified in International Publication Nos. 2007/121037, 2008/09843, and 2008/09842, in U.S. Pat. Nos. 7,157,141, 6,605,673, and 6,620,889, in US Patent Application Publication Nos. 2005/0288182, 2005/0070671, 2007/0106013, and 2006/0073969.

Further, other than the above-mentioned organic surface crosslinking agent, a polyamine polymer, particularly, having a weight average molecular weight of about 5000 to 1000000 and further about 10000 to 500000 may be used simultaneously or separately to improve the liquid permeability potential. Usable polyamine polymers are exemplified in U.S. Pat. No. 7,098,284, International Publication Nos. 2006/082188, 2006/082189, 2006/082197, 2006/111402, 2006/111403, and 2006/111404. Such polyamine polymers are preferably used for decreasing acid smell as described below.

(Various Conditions)

The use amount of the surface crosslinking agent is properly determined in a range of 0.001 to 10 parts by mass and preferably 0.01 to 5 parts by mass to 100 parts by mass of the water-absorbent resin. Water can be preferably used in combination with the surface crosslinking agent. The amount of water to be used is in a range of 0.5 to 20 parts by mass and preferably 0.5 to 10 parts by mass to 100 parts by mass of the water-absorbent resin. In the case of using the inorganic surface cross-linking agent and the organic surface crosslinking agent in combination, the agents are used in a range of 0.001 to 10 parts by mass and 0.01 to 5 parts by mass, respectively.

Further, at that time, a hydrophilic organic solvent may be used and its amount is in a range of 0 to 10 parts by mass and preferably 0 to 5 parts by mass to 100 parts by mass of the water-absorbent resin. Furthermore, at the time of mixing a cross-linking agent solution with the water-absorbent resin particles, an organic acid (salt), an inorganic acid (salt), a water-insoluble fine particle powder, and a surfactant may coexist to an extent that the effect of the present invention is not hindered, that is, in a range, for example, of 0 to 10 parts by mass, preferably 0 to 5 parts by mass, and more preferably 0 to 1 part by mass. The surfactant to be used and its use amount are exemplified in U.S. Pat. No. 7,473,739.

Further, in the case the water-absorbent resin is highly neutralized (65% by mole or higher and particularly 90% by mole or higher) as described above for decreasing the acid smell, an organic acid and an inorganic acid with acidity (particularly pKa of 6 or higher and further 5 or higher) may be used in combination in the above-mentioned range (the lower limit is generally 0.001 parts by mass or more and further 0.01 parts by mass or more) for accelerating the surface crosslinking. Examples of the organic acid are preferably polymer or non-polymeric organic acids, particularly preferably non-polymeric organic acids, and hydroxycarboxylic acids such as lactic acid, citric acid, malic acid, etc. are usable. Examples usable as the inorganic acid are sulfuric acid, hydrochloric acid, phosphoric acid, and their salts (acidic salts: e.g. aluminum sulfate), but not limited thereto. Additionally, Lewis acid and Bronsted acid usable for the surface crosslinking are exemplified in U.S. Pat. No. 5,610,208 and US Patent Application Publication No. 2009/0131633.

After being mixed with the surface crosslinking agent, the water-absorbent resin is preferably heated and thereafter cooled if necessary. The heating temperature is 70 to 300° C., preferably 120 to 250° C., and more preferably 150 to 250° C. and the heating time is preferably in a range of 1 minute to 2 hours. The heating treatment can be carried out by a common dryer or heating furnace. In the present invention, the water-absorbent resin with whiteness to a high degree can be provided even by high temperature superheating or air (hot blow) with which conventionally the coloring is intense.

Particularly in the case of aiming a sanitary material (especially a disposable diaper), the water absorbency against pressure (AAP) described below can be improved in a range described below, preferably 20 g/g or higher, and further preferably about 23 to 30 g/g, by such surface crosslinking.

(29) Surface Treatment Agent of Non-Fossil Raw Material

In the case acrylic acid is produced from a non-fossil raw material in the present invention, in terms of sustainability and renewability, a surface treatment agent also derived from a non-fossil raw material may be used as the surface treatment agent. The surface treatment agent is derived from a non-fossil raw material can be judged by, for example 14C, and polyalcohols such as glycerin, and lactic acid and its salt (monovalent salt, particularly polyvalent metal salt, and aluminum salt) may be used as the non-fossil raw material. Especially, from a viewpoint of physical properties, 1,2- (or 1,3-)propanediol and lactic acid may be used as the surface treatment agent and lactic acid and propanediol can be obtained by chemical oxidation and reduction or a fermentation method (biological oxidation) of glycerin and cellulose.

For example, glycerin to be used may be natural, synthesized, or semi-synthesized one; however from a viewpoint of sustainability of the raw material and $CO_2$ emission, natural substance-derived ones, for example, saponified fats and oils are preferable. Also, from a viewpoint of $CO_2$ emission regulation, use of biodiesel is boomed so that use of glycerin, which is a by-product, is one preferable example. The means for obtaining glycerin from fats and oils is not particularly limited and exemplified in, for example, US Patent Application Publication No. 2007/0167642, International Publication Nos. 2007/029851 and 2006/088254.

In the present invention, a glycerin-reduced product, preferably natural glycerin is reduced to propanediol to produce the surface crosslinking agent, and the surface crosslinking of the water-absorbent resin is carried out. Use of such a crosslinking agent is preferable for the water-absorbent resin which is consumed by mass consumption and discarded in terms of the load on the environments and sustainability. Further, as compared with a conventional crosslinking agent obtained by complicated organic synthesis, the crosslinking agent is excellent in the cost and safety, and further the physical properties described below (e.g., water absorbency against pressure) are improved.

The production method of propanediol is not particularly prescribed in the present invention; however, a production method of 1,3-propanediol from glycerin is described in Japanese Patent Application Publication Tokkai No. 2005-102533 and US Patent Application Publication No. 2007/0148749. A production method of 1,2-propanediol from glycerin is described in U.S. Pat. No. 5,276,181, US Patent Application Publication No. 2005/0244312, and Japanese Patent Application Publication Tokkai No. 2007-283175. Further, additionally, propanediol and lactic acid, which are surface treatment agents derived from non-fossil raw materials disclosed in Japanese Patent Application Publication Tokkai No. 2009-96812 (particularly ([0032] to [0047] and its Production Examples and Examples), are also preferably used.

(30) Addition Step of Basic Substance

Since propionic acid and acetic acid have low boiling points as compared with hydroxypropionic acid, in the case the water-absorbent resin obtained by the present invention has a malodor (acid smell) problem, a step of adding a basic substance preferably after the polymerization step is further included when the acrylic acid containing much propionic acid and acetic acid (e.g.; 400 ppm or more) is used.

That is, from a viewpoint of acid smell derived from a saturated organic acid (particularly propionic acid), higher neutralization degree is more preferable, and from a viewpoint of removal at the time of drying, lower neutralization degree is more preferable. Accordingly, from a viewpoint of acid smell, the neutralization degree at the time of polymerization, more preferably the neutralization degree before drying is adjusted to be 80% by mole or lower, more preferably 70% by mole or lower, and even more preferably 60% by mole or lower, or a basic substance is added to the polymer powder surface as a preferable embodiment. Furthermore, as described, in order to lower the acid smell, the neutralization degree of the obtained water-absorbent resin is adjusted to be in a range of 10 to 100% by mole, further in a range of 30 to 95% by mole, and the final neutralization degree is adjusted to be high and is increased preferably to 65% by mole or higher, 70% by mole or higher, 75% by mole or higher, 80% by mole or higher, 85% by mole or higher, and 90% by mole or higher in order. Such adjustment of the neutralization degree is carried out by adding the monomer at the time of polymerization or a base after polymerization.

Addition of a basic substance decreases the acid smell and improves the liquid permeability potential. The basic substance is preferably added after drying, or after crushing, or particularly after surface crosslinking. Consequently, the surfaces of the water-absorbent resin particles are controlled to be basic. Examples usable as the basic substance to be added are inorganic or organic basic substances and further water-soluble bases or water-dispersed bases.

Examples of the organic basic substance are those exemplified in the above-mentioned surface crosslinking agent and may be basic polyvalent metal salts such as aluminum lactate, or organic amines, particularly organic polyamines, especially polyamine polymers with a molecular weight of 3000 or higher and examples usable as the inorganic basic substance are carbonates, dicarbonates, concretely carbonates and dicarbonates of alkali metals and particularly sodium carbonate. Usable polyamine polymers are water-soluble polyamine polymers and water-swellable polyamine polymers and preferably water-soluble polyamine polymers, and preferable types and their molecular weights are those exemplified as the above-mentioned surface cross-linking agents.

The use amount of these basic substances is generally 10 parts by mass or lower, further, 0.01 to 5 parts by mass, and particularly 0.1 to 3 parts by mass to 100 parts by mass of the water-absorbent resin. It is in a range of 0.1 to 300 times by mass, further 1.1 to 100 times by mass, and particularly 2 to 50 times by mass with respect to propionic acid. Preferably the basic substance is added to the surfaces of the water-absorbent resin particles, and the surfaces are made to be basic or composition.

The addition of the basic substance to the water-absorbent resin may be carried out directly or in form of a solution or dispersion by using about 0 to 30 parts by mass of a solvent (preferably water). Further, in the case of using a solvent, the solvent may be dried out or allowed to remain, and in terms of water-absorbing speed and impact resistance, a prescribed amount of water is preferably adjusted to remain (e.g., water content 0.1 to 10 mass %).

(31) Other Steps

Besides the above-mentioned steps, as required, a recycling step of the evaporated monomer, a granulating step, a fine powder removing step, a fine powder recycling step, etc. may be added. Further, in order to exhibit the effect of stabilization over time, prevent gel deterioration, or the like, an additive described below may be used for the monomer or the polymer thereof.

(32) Water-Absorbent Resin and its Properties

The water-absorbent resin of the present invention obtained by adding the above-mentioned basic substance is a polyacrylic acid-based water-absorbent resin containing propionic acid and the basic substance, and preferably containing the basic substances in an amount 1.1 to 1000 times by mass with respect to propionic acid. Preferable basic substances are inorganic salts and powders. Further, in terms of coloring over time, an additive selected from a chelating agent, a reducing inorganic salt, and a hydroxycarboxylic acid is additionally contained.

Since the water-absorbent resin is provided with improved water absorbency and contains a prescribed amount of propionic acid, it shows an antibacterial effect. Moreover, due to the basic substance, it is free from acid smell. Further, in the case acrylic acid derived from a non-fossil raw material is used as the above-mentioned acrylic acid, the present invention can provide a polyacrylic acid-based water-absorbent resin with YI≤30 after an accelerating test, which is a polyacrylic acid-based water-absorbent resin derived from a non-fossil raw material. Further in terms of antibacterial property, acetic acid and propionic acid may be contained more. The preferable contents are in the above-mentioned ranges. The acrylic acid is preferably acrylic acid from a non-fossil raw material in an amount of 50 mass % or more, further 70 mass %, and furthermore 90 mass % in the raw material. In the case the acrylic acid derived from a non-fossil raw material solely by itself cannot satisfy the production amount (supply amount) and is merely a trace component and is not suitable for production of the water-absorbent resin, acrylic acid derived from a fossil raw material is preferably used in combination as required. A preferable ratio in combination is within the above-mentioned range. The water-absorbent resin using the acrylic acid derived from a non-fossil raw material is preferable in terms of sustainability and renewability as a mass consumption material and has white color unlike a conventional one.

In the case a natural substance (particularly, a non-fossil raw material) is used as a raw material of acrylic acid, the ratio of the non-fossil raw material can be specified based on 14C (radioactive carbon)/C (carbon) of the obtained acrylic acid according to US Patent Application Publication No. 2007/219521. The acrylic acid (salt)-based water-absorbent resin obtained from a conventional fossil raw material (particularly, petroleum and further propylene) has 14C/C lower than $1.0 \times 10^{-14}$, whereas the water-absorbent resin of the present invention has 14C/C preferably $1.0 \times 10^{-14}$ or higher, more preferably $1.0 \times 10^{-13}$ or higher, and even more preferably higher than $1.0 \times 10^{-12}$. In the case of using a non-fossil raw material at a ratio of almost 100 mass %, the upper limit is $1.2 \times 10^{-12}$. The 4C/C can be measured by isotope mass spectroscopy and is described in U.S. Pat. Nos. 3,885,155, 4,427,884, 5,438,194, and 5,661,299.

In the case of using a non-fossil raw material and a fossil raw material at the above-mentioned ratio at the time of obtaining acrylic acid, the ratio is determined in a range described in (11), 1:99 to 99:1 and the sustainability (the non-fossil raw material ratio) with the ratio of 14C (radioactive carbon)/C (carbon) is preferably 1 to 99%, more preferably 10 to 90%, furthermore preferably 20 to 80%, and even more preferably 30 to 70%. In this case, it is also preferable that one of acrylic acid (e.g., derived from a non-fossil raw material) contains 400 ppm or higher of propionic acid and another one (e.g., derived from a fossil raw material) contains less than 400 ppm.

That is, the present invention provides a polyacrylic acid-based water absorbent resin using a non-fossil raw material and a fossil raw material in combination for acrylic acid. The ratio for the combination use can be specified by the content of 14C and a preferable range is described above. The use ratio of two kinds of different acrylic acids may be determined properly based on the prices (raw material costs) of both acrylic acids, supply amounts, trace components (propionic acid and other trace components), etc. and the raw materials cost of the water-absorbent resin can be hedged by using a plurality of raw material sources of a fossil raw material and a non-fossil raw material as acrylic acid. Such a novel water-absorbent resin is excellent in the cost and the stability of raw material sources and easy to contain the trace components such as propionic acid at the optimum ratio and therefore provided with stable physical properties and widely usable as an economical water-absorbent resin with high physical properties. Hydroxypropionic acid and glycerin are used as the non-fossil raw material of acrylic acid, and petroleum and coal are used as the fossil raw material.

(33) Physical Property of Water-Absorbent Resin

In the case of obtaining a sanitary material, particularly a disposable diaper, it is preferable to control at least one of the following (a) to (f), further two or more including AAP, and furthermore three or more by the above-mentioned polymerization and surface crosslinking. In the case the followings are not satisfied, the water-absorbent resin sometimes fails to exhibit sufficient function in form of a high concentration diaper described below. In addition, the preferable particle size and 14C ratio (ratio of non-fossil raw material) are as described above.

(a) Early-Phase Coloring

The water-absorbent resin is excellent in the early-phase coloring, and L value (Lightness) in the Hunter Lab surface color system is preferably 85 or higher, more preferably 87 or higher, and even more preferably 89 or higher. The b value is preferably −5 to 10, more preferably −5 to 5, furthermore preferably −4 to 4; the a value is preferably −2 to 2, more preferably −1 to 1, furthermore preferably −0.5 to 1, and even preferably 0 to 1; the YI is preferably 10 or lower, more preferably 8 or lower, and furthermore preferably 6 or lower. WB is preferably 70 or higher, more preferably 75 or higher, and furthermore preferably 77 or higher. The water-absorbent resin is further excellent in the coloring over time and shows sufficient whiteness index even at a high temperature and high humidity, which is an accelerating test (model) for long time preservation.

(b) Absorbency Against Pressure (AAP)

In some cases, in order to prevent a leakage from a diaper, using the above-mentioned polymerization as one example of achieving means, the water absorbency (AAP) to an 0.9 mass % aqueous sodium chloride solution under pressure of 1.9 kPa and further 4.8 kPa is controlled to be preferably 20 (g/g) or higher, more preferably 22 (g/g) or higher, and furthermore preferably 24 (g/g) or higher. The upper limit is about 40 g/g in consideration of the balance with other physical properties.

(c) Permeability Potential (SFC)

In some cases, in order to prevent a leakage from a disposable diaper, using the above-mentioned polymerization as one example of achieving means, the permeability potential under pressure, which is a flow conductivity SFC to an 0.69 mass % aqueous sodium chloride solution, is controlled to be 1 $(\times 10^{-7} \cdot cm^3 \cdot s \cdot g^{-1})$ or higher, preferably 10 $(\times 10^{-7} \cdot cm^3 \cdot s \cdot g^{-1})$ or higher, more preferably 50 $(\times 10^{-7} \cdot cm^3 \cdot s \cdot g^{-1})$ or higher, furthermore preferably 70 $(\times 10^{-7} \cdot cm^3 \cdot s \cdot g^{-1})$ or higher, and even more preferably 100 $(\times 10^{-7} \cdot cm^3 \cdot s \cdot g^{-1})$ or higher.

(d) Water Absorbency Without Pressure (CRC)

The water absorbency without pressure (CRC) is controlled to be preferably 10 (g/g) or higher, more preferably 20 (g/g) or higher, furthermore preferably 25 (g/g) or higher, and even more preferably 30 (g/g) or higher. The CRC is more preferable as it is higher, and the upper limit is not particularly limited; however, in consideration of balance with other physical properties, it is preferably 50 (g/g) or lower, more preferably 45 (g/g) or lower, and furthermore preferably 40 (g/g) or lower.

(e) Amount of Water-Soluble Components (Extractables)

The amount of water soluble components is preferably 0 to 35 mass % or lower, more preferably 25 mass % or lower, furthermore preferably 15 mass % or lower, and even more preferably 10 mass % or lower.

(f) Residual Monomer

Using the above-mentioned polymerization as one example of achieving means, the amount of the residual monomer is adjusted to be generally 500 ppm or lower, preferably 0 to 400 ppm, more preferably 0 to 300 ppm, and even more preferably 0 to 200 ppm.

(g) Water Content

The water content is so adjusted preferably as to keep a prescribed amount of water remain (e.g., water content 0.1 to 10 mass % and further 1 to 8 mass %) in terms of water absorbing speed and impact resistance.

(34) Other Additives

Further, in accordance with the purpose, 0 to 3 mass % and preferably 0 to 1 mass % of an oxidizing agent, an antioxidant, water, a polyvalent metal compound, a water-insoluble inorganic or organic powder such as silica and metal soap, etc.

as well as a deodorant, an antibacterial agent, a polymer polyamine, pulp, and thermoplastic fibers, etc. may be added to the water-absorbent resin.

(35) Purpose of use

The purpose of use of the water-absorbent resin of the present invention is not particularly limited; however it is preferable to use the water-absorbent resin for an absorbing article such as a disposable diaper, a sanitary napkin, an incontinence pad, or the like. Particularly, the water-absorbent resin exhibits excellent performance in case of being used in a high-consistency diaper (one diaper in which a large amount of the water-absorbent resin is used) that conventionally has a problem of malodor and coloring derived from raw materials and particularly in the case of being used in a top layer portion of an absorbent of the absorbing article.

The content (core concentration) of the water-absorbent resin in the absorbent which may contain arbitrarily other absorbing materials (pulp fibers or the like) in the absorbing article is 30 to 100 mass %, preferably 40 to 100 mass %, more preferably 50 to 100 mass %, furthermore preferably 60 to 100 mass %, moreover preferably 70 to 100 mass %, and even more preferably 75 to 95 mass % to exhibit the effect of the present invention. For example, in the case of using the water-absorbent resin of the present invention in the above-mentioned concentration for the top layer portion of absorbent, owing to the high permeability potential (permeability under pressure), the water-absorbent resin is excellent in the diffusion with respect to the absorbed liquid such as urine or the like and the absorption amount of the entire absorbing article such as a disposable diaper can be improved due to the efficient liquid distribution. Further, it is made possible to provide an absorbing article having the absorbent which keeps sanitary white color state.

The above-mentioned absorbent is preferably formed by compression so as to have a density of 0.06 to 0.50 g/cc and a basis weight of 0.01 g/cm$^2$ to 0.20 g/cm$^2$. Further, the above-mentioned absorbent has a thickness of 30 mm or thinner, preferably 20 mm or thinner, and more preferably 10 mm or thinner, and it is possible to provide the absorbent suitable for a disposable diaper reduced in thickness.

EXAMPLES (Evaluation of Physical Properties)
(a) Early-Phase Coloring

The early-phase coloring was measured by using a spectroscopic colorimeter SZ-Σ80COLOR MEASURING SYSTEM (NIPPON DENSHOKU INDUSTRIES CO., LTD.). The set conditions for the measurement were as follows: reflection measurement was employed, a powder/paste container, which is an accessory for the spectroscopic colorimeter and having an inner diameter of 30 mm and a height of 12 mm, was used; a powder/paste white plate No. 2 having a rounded shape was used as a standard; and a 30 φ projector pipe was used. The accessory powder/paste container was filled with about 5 g of the water-absorbent resin.
(b) Coloring Over Time The water-absorbent resin was left under high temperature and high humid condition (70° C., 75% RH) for 10 days and the color was measured by the above-mentioned method described in (a)

(c) Other Physical Properties

According to the above-mentioned ERT of EDANA and US Patent Application Publication No. 2006/204755, CRC (water absorbency without pressure) with 0.9 mass % normal saline solution, pH soluble matter, residual acrylic acid, and SFC (flow conductivity of normal saline solution) were measured.
(d) Odor Gel odor was evaluated by filling a cylindrical container having a capacity of 100 ml and a cover (trade name: Pack Ace) with 50 g of 0.9% normal saline water, swelling and gelling 2 g of the water-absorbent resin, and putting the cover. After the container was left still for a prescribed time, the cover was opened and 10 panelists smelled the gel order and graded based on 5-grade evaluation (better as the number was lower: 1 no malodor; 2 almost no malodor . . . 5 strong smell) and the average value was employed as the odor.

Production Example 1

According to Example 2 of U.S. Pat. No. 6,444,744, acrylic acid containing 100 ppm of acetic acid and 100 ppm of propionic acid was produced. At that time, as a polymerization inhibitor, 60 ppm of p-methoxyphenol was added. The dimer amount was 100 ppm or lower, the amounts of furfural and protoanemonine were 1 ppm or lower, respectively; and iron was ND. The 14C amount of the obtained acrylic acid was coincident with the theoretical value (the value of fossil raw material).
(Monomer Preparation Method 1)

The acrylic acid obtained in the above-mentioned Production Example 1 was added to an aqueous NaOH solution obtained using caustic sodium containing 1.4 ppm of iron (based on Fe$_2$O$_3$) under cooling condition (liquid temperature of 20° C. at the time of neutralization) to carry out neutralization at 75% by mole. A monomer with 100 ppm content of 3-hydroxypropionic acid (to monomer) was obtained. The Fe amount in the monomer was about 0.7 ppm, derived from NaOH.
(Monomer Preparation Method 2)

A monomer with 2100 ppm content of 3-hydroxypropionic acid was obtained by changing the neutralization temperature to 60° C. in the monomer preparation method 1. It could be understood that the amount of 3-hydroxypropionic acid after neutralization was significantly different even in same acrylic acid in accordance with the neutralization temperature.
(Monomer Preparation Method 3)

A monomer with 3200 ppm content of 3-hydroxypropionic acid was obtained by performing neutralization 20 days after the refining of acrylic acid in the monomer preparation method 1. It could be understood that the amount of 3-hydroxypropionic acid after neutralization was significantly different even in same acrylic acid in accordance with the time after refining.
(Monomer Preparation Method 4)

According to International Publication No. 2006/087084, acrolein containing by-products such as propanal was obtained by dehydrating glycerin (derived from natural fats and oils) in the presence of a strong acid solid catalyst. Next, the acrolein containing propanal or the like was oxidized in vapor-phase oxidation to obtain gaseous acrylic acid. The gaseous acrylic acid was trapped by using water to obtain an aqueous acrylic acid solution. Then, the resulting solution was distilled to obtain acrylic acid containing 3 mass % of propionic acid and derived from a non-fossil raw material. Using the acrylic acid derived from a non-fossil raw material, a monomer was prepared in the same manner as that in monomer preparation method 1. The 14C amount of the obtained acrylic acid was coincident with the theoretical value (the value of non-fossil raw material).

(Monomer Preparation Method 5)

The acrylic acid containing 3 mass % of propionic acid and derived from a non-fossil raw material and obtained in the above-mentioned monomer preparation method 4 was distilled further two times; however the acrylic acid was scarcely changed although the amount of propionic acid was slightly decreased. Using the acrylic acid derived from a non-fossil raw material, a monomer was prepared in the same manner as that in monomer preparation method 1. The 14C amount of the obtained acrylic acid was coincident with the theoretical value (the value of non-fossil raw material).

(Monomer Preparation Method 6)

The acrylic acid containing 3 mass % of propionic acid and derived from a non-fossil raw material and obtained in the above-mentioned monomer preparation method 4 was refined by crystallization while sacrificing the yield to obtain acrylic acid containing 1 mass % of propionic acid and derived from a non-fossil raw material. Using the acrylic acid derived from a non-fossil raw material, a monomer was prepared in the same manner as that in monomer preparation method 1. The 14C amount of the obtained acrylic acid was coincident with the theoretical value (the value of non-fossil raw material).

Comparative Example 1

The acrylic acid obtained in the above-mentioned Production Example 1 was neutralized according to Preparation method 1 to obtain an aqueous sodium acrylate solution (1) with a concentration of 35 mass % and a neutralization degree of 75% by mole and thereafter, 0.05% by mole (to acrylic acid) of an inner crosslinking agent, polyethylene glycol diacrylate, was dissolved to obtain a monomer (1). Immediately (within 5 minutes), 350 g of the monomer (1) was put in a 1 L capacity cylindrical container and degassed for 20 minutes by bubbling nitrogen at 2 L/min. Next, an aqueous solution containing 0.12 g/mole (to monomer) of sodium persulfate and 0.005 g/mole (to monomer) of L-ascorbic acid was added under condition of stirring with a stirrer to start polymerization. After starting the polymerization, stirring was stopped to carry out static aqueous solution polymerization. The peak polymerization temperature 110° C. was shown after about 14 minutes and the product was taken out of the polymerization container after 30 minutes.

The obtained hydrogel type crosslinked polymer (1) was made small by a meat chopper (hole 8 mm) at 45° C. and immediately (within 3 minutes) put in a drier and heated and dried for 20 minutes by a hot air dryer at 170° C. Further, the dried polymer (solid matter, about 95 mass %) was crushed by a roll mill and classified into 150 to 850 μm by a JIS standard sieve to obtain a comparative water-absorbent resin (1). The waste gas of the dryer was trapped by an aqueous alkali solution to recover acrylic acid and propionic acid.

Comparative Example 2

When the same operation was carried out as that in Comparative Example 1, except that 200 ppm of propionic acid was further added to the acrylic acid monomer to increase the total to 300 ppm, the polymerization peak time and peak temperature same as those in Comparative Example 1 were shown. Drying and crushing were carried out in the same manner as that in Comparative Example 1 to obtain comparative water-absorbent resin (2).

Example 1

Neutralization was carried out in the same manner as that in Production Method 1, except that 1000 ppm of propionic acid was further added to the acrylic acid monomer to increase the total to 1100 ppm. The 75% neutralized sodium acrylate contains 1100 ppm of propionic acid (to acrylic acid before neutralization). When polymerization was carried out in the same manner as that in Comparative Example 1, the polymerization peak time and peak temperature almost same as those in Comparative Example 1 were shown. Drying and crushing were carried out in the same manner as that in Comparative Example 1 to obtain water-absorbent resin (1).

Example 2

Acrylic acid previously mixed with 3 mass % of propionic acid was used as a monomer of acrylic acid in Comparative Example 1. When polymerization of the monomer containing 3 mass % of propionic acid (to acrylic acid before neutralization) was carried out in the same manner as that in Comparative Example 1, the polymerization peak time and peak temperature almost same as those in Comparative Example 1 were shown. Drying and crushing were carried out in the same manner as that in Comparative Example 1 to obtain water-absorbent resin (2).

Example 3

Acrylic acid previously mixed with 5 mass % of propionic acid was used as a monomer of acrylic acid in Comparative Example 1. When polymerization of the monomer containing 5 mass % of propionic acid (to acrylic acid before neutralization) was carried out in the same manner as that in Comparative Example 1, the polymerization peak time and peak temperature almost same as those in Comparative Example 1 were shown. Drying and crushing were carried out in the same manner as that in Comparative Example 1 to obtain water-absorbent resin (3).

(Conclusion)

Results of Examples 1 to 3 and Comparative Examples 1 and 2 are shown in Table 1.

As shown in Table 1, existence of propionic acid at the time of polymerization did not cause any negative effect on the polymerization, physical properties, coloring, and stability of the monomer and moreover, CRC (water absorbency without pressure) of the water-absorbent resin was increased (FIG. 1).

In addition, the gelatinization of the monomer became more significant when further high temperature polymerization (e.g., 35° C. or more at starting) and high concentration polymerization (e.g., 40 mass % or more) and increasing the scale (e.g., 0.5 Mt/hr or higher) were carried out and, therefore, the present invention is more preferably applied.

TABLE 1

Effect of propionic acid at the time of polymerization

|  |  | Comparative Example 1 | Comparative Example 2 | Example 1 | Example 2 | Example 3 |
|---|---|---|---|---|---|---|
| Monomer |  |  |  |  |  |  |
| Fe | ppm | 0.7 | ← | ← | ← | ← |
| Used propionic acid | ppm | 100 | 300 | 1100 | 30000 | 50000 |
| Polymerized gel |  |  |  |  |  |  |
| Residual propionic acid | ppm | 100 | 300 | 1100 | 30000 | 50000 |
| Water-absorbent resin |  |  |  |  |  |  |
| Residual propionic acid | ppm | 100< | 200 | 800 | 20000 | 33000 |
| Water absorbency (CRC) | g/g | 40.6 | 40.6 | 41.4 | 42.4 | 43.9 |
| Malodor sensory test |  | 3 | 3 | 3 | 3 | 4 | note)
Additionally, the following results about same level in Examples and Comparative Examples
(1) polymerization time (14 minutes by peak)
(2) polymerization time (induction time; within 1 minute)
(3) residual monomer (300 ppm)
(4) coloring L/a/b after drying (L: around 88, a: around −1, b: around 3)

Comparative Example 3

After a mixture of 0.05 parts by mass of ethylene glycol diglycidyl ether, as a surface crosslinking agent (trade name; Denacol (registered trade mark)EX-810)/3 parts by mass of water/1 part by mass of isopropyl alcohol was added by spraying to 100 parts by mass of the comparative water-absorbent resin (1) obtained in Comparative Example 1, the obtained mixture was heated in an oil bath at 195° C. for 60 minutes to obtain a surface-crosslinked comparative water-absorbent resin (3).

Example 4

The same operation was carried out as that of Comparative Example 3, except that the water-absorbent resin (1) was used in place of the comparative water-absorbent resin (1) in the surface crosslinking in Comparative Example 3 to obtain a surface-crosslinked water-absorbent resin (4).

(Conclusion)

Results of Example 4 and Comparative Example 3 are shown in Table 2. As shown in Table 2, the physical properties were improved even after surface-crosslinking due to the existence of propionic acid at the time of polymerization.

TABLE 2

Effect of propionic acid on surface crosslinking

|  |  | Comparative Example 3 | Example 4 |
|---|---|---|---|
| Used water-absorbent resin |  | Comparative water-absorbent resin (3) | Water-absorbent resin (4) |
| Water absorbency (CRC) | g/g | 40.3 | 40.4 |
| Water absorbency against pressure (AAP) | g/g | 23.4 | 24.5 |
| Malodor sensory test |  | 3 | 3 | note)
No substantial change of residual propionic acid before and after the described surface crosslinking.
note)
Particle size was controlled to be 850 μm under sieve.

Example 5

The water-absorbent resin (3) was granulated by adding 5 mass % of water to the water-absorbent resin (3) obtained in Example 3 to obtain a water-absorbent resin (5).

Example 6

In Example 5, 0.5 mass % of sodium carbonate was previously dissolved in 5 mass % of water, and the water-absorbent resin (3) was granulated in the same manner as that in Example 5 to obtain a water-absorbent resin (6).

Example 7

In Example 5, 1.25 mass % of sodium carbonate was previously dissolved in 5 mass % of water and the water-absorbent resin (3) was granulated in the same manner as that in Example 5 to obtain a water-absorbent resin (7).

Example 8

In Example 5, 1.25 mass % of polyethyleneimine with a molecular weight of 10000 was previously dissolved in 5 mass % of water, and the water-absorbent resin (3) was granulated in the same manner as that in Example 5 to obtain a water-absorbent resin (8).

(Conclusion)

The effect of the basic substance is shown in Table 3. As shown in Table 3, a small amount of the basic substance improved malodor without deteriorating the capability. Further, use of a polyamine or a polyvalent metal as the basic substance also improves the liquid permeability.

TABLE 3

Effect of basic substance

|  | Additive agent | Malodor sensory test |
|---|---|---|
| Example 5 | water 5% | 3 |
| Example 6 | water 5% + $Na_2CO_3$ 0.5% | 2.6 |

TABLE 3-continued

Effect of basic substance

| Additive agent | | Malodor sensory test |
|---|---|---|
| Example 7 | water 5% + Na$_2$CO$_3$ 1.25% | 2.4 |
| Example 8 | water 5% + polyethyleneimine 1.25% | 2.2 | note)
Particle size was controlled to be 850 μm under sieve.

Example 9

A sheet (absorbent) of 10 cm×40 cm was produced by evenly mixing 10 g of the water-absorbent resin obtained in Example 4 and 10 g of crushed wood pulp and thereafter pressing the mixture. Using the adsorbent, a disposable diaper was produced. The disposable diaper was air-tightly wrapped in a bag made of polyethylene and opened after 1 month and at the opening, no malodor was sensed.

Example 10

In place of addition of 1000 ppm of propionic acid further to the monomer, which is acrylic acid (propionic acid content 100 ppm), in Example 1, acrylic acid (propionic acid content 2000 ppm) derived from a natural substance was mixed at about 47:53 (mass ratio) to obtain acrylic acid containing propionic acid in total of 1100 ppm (two type mixture) and neutralization was carried out in the same manner as that in Preparation method 1.

The 75% neutralized sodium acrylic acid contained 1100 ppm of propionic acid (to acrylic acid before neutralization). When polymerization was carried out in the same manner as that in Comparative Example 1, the polymerization peak time and peak temperature almost same as those in Comparative Example 1 were shown. Drying and crushing were carried out in the same manner as that in Comparative Example 1 to obtain water-absorbent resin (10). The 14C amount of the obtained water-absorbent resin (10) was coincident with the theoretical value (the ratio of the non-fossil raw material and the fossil raw material).

The obtained water-absorbent resin (10) had the same physical properties as those of Example 1, and with no need of propionic acid addition, the water absorbency was improved similarly to Example 1 by the propionic acid which the acrylic acid originally had. The results are shown in Table 4.

TABLE 4

| | | Example 10 |
|---|---|---|
| Water absorbency (CRC) | g/g | 41.4 |
| Absorbency against pressure (AAP) | g/g | 26 |
| flow conductivity (SFC) | ×10$^{-7}$ · cm$^3$ · s · g$^{-1}$ | 10 |
| coloring | L | 87.8 |
| | a | −0.7 |
| | b | 2.9 | note)
Particle size was controlled to be 850 μm under sieve.

(Production Example of Propanediol Derived from Natural Substance)

The following reaction was carried out using a natural substance-derived glycerin (saponified material of oils and fats). That is, MgO was prepared by firing basic magnesium carbonate (Ishizu Kagaku Co., Ltd.) at 500° C. for 3 hours under air flow. As a catalyst of glycerin reduction, 0.10 g of the prepared MgO and 0.05 g of Ru/C (H1002 P/W, produced by Degussa Co., Ltd, Ru concentration 5 mass %, water content 55 mass %) were loaded to a 15 ml capacity autoclave. After 4.2 g of an 20 mass % aqueous glycerin solution was further loaded to the autoclave, the air in the autoclave was replace with N2 gas. Next, after the inside of the autoclave was heated to 180° C., H$_2$ gas was introduced until the pressure was increased to 8 MPa and reduction reaction of glycerin to 1,2-propanedil was carried out in batch way under condition of 180° C. for 10 hours. The 14C amount of the obtained propanediol was coincident with the theoretical value (the value of non-fossil raw material).

Example 11

In Example 4, 0.8 parts by mass of 1,2-propanediol obtained in the above-mentioned Production Example was used in place of 0.05 parts by mass of ethylene glycol diglycidyl ether as a surface crosslinking agent to carry out surface crosslinking.

Examples 12 and 13

In the polymerization (induction time 0.5 minutes) of Example 1, the Fe amount of NaOH was separately changed to adjust the Fe amount in the monomer to be 1.7 ppm or ND. In both cased, the induction time became 1 minute and 4 minutes and it was found that a prescribed amount of iron was suitable for polymerization in accordance with the induction time and residual monomer. Further, in the case the Fe amount was 1.7 ppm, coloring (worsening of L/a/b: about 1 point) was observed.

Example 14

To Comparative Example 1/Example 1 for removing propionic acid after polymerization by hot air drying at 170° C., propionic acid was removed from a hydrophobic organic solvent.

That is, an inner crosslinking agent, which is polyethylene glycol diacrylate (0.05% by mole), 2.0 mass % of a thickener, which is hydroxyethyl cellulose HEC EP 850 (Daicel Chemical Industries, Ltd.), 1.0 mass % of propionic acid, and 0.12 g/mol (to monomer) of a polymerization initiator, which is sodium persulfate, were dissolved in an aqueous solution of sodium acrylate with a concentration of 35 mass % and a neutralization degree of 75% by mole, and replacement with nitrogen was carried out. The aqueous monomer solution was dropwise added by a titration funnel to a four-neck flask containing 200 g of cyclohexane containing 2.8 mass % of sucrose fatty acid ester F-50 (Dai-Ichi Kogyo Seiyaku Co., Ltd.) and equipped with stirring blades to disperse the solution in form of droplets of about 1 mm to 0.1 mm in the cyclohexane. Polymerization was carried out for 40 minutes by keeping the bath temperature at 60° C. and next, the bath temperature was adjusted to be 85 to 92° C. to carry out azeotropic dehydration for 90 minutes and thus dried and spherical water-absorbent resin (14) was obtained. Water absorbency (CRC)=31 g/g, soluble matter 4%, and the amount of propionic acid in the water-absorbent resin was 0.25 mass % (removal ratio was 75%).

As compared with the hot air-dried water-absorbent resin in Table 1 (removal ratio: around 35%), the water-absorbent resin subjected to the azeotropic dehydration after the reversed-phase suspension polymerization was provided with a high propionic acid removal ratio (removal ratio: about 75%) and was free from a problem of malodor in the malodor test similarly carried out as shown in Table 3.

Example 15

After an inner crosslinking agent, which is polyethylene glycol diacrylate (0.06% by mole), and 50 ppm of a chelating agent, which is diethylene triamine pentaacetic acid trisodium salt, were dissolved in an aqueous solution of sodium acrylate with a concentration of 45 mass % and a neutralization degree of 80% by mole and obtained by using acrylic acid containing 1.0 mass % of propionic acid, the mixture was heated to 95° C., and 0.02 g/mole (to monomer) of a water-soluble azo type initiator V-50 (Wako Pure Chemical Industries, Ltd.) and 0.12 g/mol (to monomer) of sodium persulfate were added to carry out polymerization. The gel after the polymerization was made small by a meat chopper and the hydrogel was further heat-dried at 170° C. for 20 minutes to obtain a water-absorbent resin powder (15). The results are shown in Table 5.

Example 16

A water-absorbent resin powder (16) with 35.9 g/g of water absorbency (CRC) was obtained in the same manner of polymerization and drying as those in Example 15, except that the neutralization ratio of the monomer was changed to 70% by mole. The results are shown in Table 5.

Example 17

A water-absorbent resin powder (17) was obtained in the same manner of polymerization and drying as those in Example 15, except that the neutralization ratio of the monomer was changed to 50% by mole. The results are shown in Table 5.

The water-absorbent resin powder (17) obtained in Example 17 was mixed with sodium carbonate according to Example 6 to make the surface basic. The results are shown in Table 5.

Comparative Example 4

A comparative water-absorbent resin powder (4) with 32.8 g/g of water absorbency (CRC) was obtained in the same manner of polymerization and drying as those in Example 17, except that the propionic acid amount was changed to 100 ppm in Example 16 (neutralization ratio 70% by mole, propionic acid 1 mass %).

TABLE 5

Polymerization of the monomer containing 1 mass % of propionic acid and removal of propionic acid after polymerization

| Examples | Neutralization ratio [mol %] | Drying | Propionic acid removal ratio | Acid smell |
|---|---|---|---|---|
| Example 14 | 75 | Azeotropic dewatering | 75 | Odorless |
| Example 15 | 80 | 170° C. Hot-air drying | 37 | Nearly odorless |
| Example 16 | 70 | Same as above | 40 | Nearly odorless |
| Example 17 | 50 | Same as above | 54 | Slightly odor |
| Example 18 | 50 → 70 | Same as above | 47 | Odorless |

(Conclusion)

With respect to the saturated organic acid contained much in acrylic acid derived from a non-fossil raw material, particularly, propionic acid, the acid was scarcely separated by distillation of the raw material acrylic acid, whereas it could be efficiently removed from the water-absorbent resin after polymerization by drying, preferably hot-air drying, and further azeotropic dehydration. Lower neutralization ratio was more preferable for the removal; however it was preferable to further add a basic substance in terms of malodor.

Comparative Example 5

In Example 2, polymerization was carried out using acetic acid in place of propionic acid, the water absorbency was 40.9 g/g and the effect of improving the water absorbency was scarcely observed.

Further, in comparison of Example 16 and Comparative Example 4, same in Table 1, it could be understood that the water absorbency of the obtained water-absorbent resin was increased by about 3 g/g by existence of 1 mass % of propionic acid in the monomer.

Example 19

Polymerization was carried out in the same manner as that in Example 2 (propionic acid 3 mass %), except that the acrylic acid (propionic acid 3 mass %) derived from a non-fossil raw material and obtained in Monomer preparation method 4 was used. A water-absorbent resin (19) similar to that of Example 2 was obtained. The water-absorbent resin was a water-absorbent resin derived from the non-fossil raw material. Additionally, the 14C amount of the obtained water-absorbent resin was coincident with the theoretical value (the value of fossil raw material).

Example 20

Polymerization was carried out in the same manner as that in Example 14 (propionic acid 1 mass %), except that the acrylic acid (propionic acid 1 mass %) derived from a non-fossil raw material and obtained in Monomer preparation method 6 was used. The removal ratio of propionic acid of the water-absorbent resin (20) subjected to azeotropic dehydration after the reversed phase suspension polymerization was about 75% and it was easier than refining of acrylic acid.

Example 21

Same operation as that in Example 1 was carried out, except that 20 ppm of phenol ($C_6H_5OH$) was added to the monomer at the time of polymerization in Example 1. The physical properties of the obtained water-absorbent resin were almost same as those of Example 1; however, the YI value was improved from 7.1 to 6.6.

Example 22

In Example 15, the drying after the aqueous solution polymerization was changed to the azeotropic dehydration according to Example 14. That is, the gel after polymerization obtained in Example 15 was made small (about 1 mm) by a meat chopper and the obtained hydrogel was azeotropically dehydrated by being stirred and dispersed in cyclohexane containing sucrose fatty acid ester F-50 (Dai-Ichi Kogyo Seiyaku Co., Ltd.). In the water-absorbent resin (22) after drying, 72 mass % of propionic acid was removed.

Example 23

Glycerin in amount of 0.5 parts by mass/water in amount of 2 parts by mass were mixed with the water-absorbent resin (15) having a neutralization ratio of 80% and obtained in Example 15 in amount of 100 parts, and surface crosslinking was carried out at a heating temperature of 180° C. for 30 minutes and as a result, the water absorbency against pressure AAP was 18 g/g.

Example 24

Surface crosslinking was carried out in the same manner as in Example 23, except that the water-absorbent resin (18) having a neutralization ratio of 50% and obtained in Example 15 was used. The water absorbency against pressure AAP was 21 g/g.

Example 25

In Example 23, 0.5 parts by mass of phosphoric acid was used in combination as the surface crosslinking agent and consequently, the water absorbency against pressure AAP became 22 g/g.

From Examples 23 to 25, it could be understood that in terms of acid smell, high neutralization (e.g. 80% by mole neutralization) was desirable; however the surface crosslinking efficiency was low and, therefore, it was suitable for using an organic acid or an inorganic acid in combination as a surface treatment agent.

Example 26

In Example 16 (neutralization ratio 70% by mole, propionic acid 1 mass %), a water-absorbent resin (26) with a water absorbency (CRC) of 36.5 g/g was obtained by carrying out polymerization, drying, and crushing in the same manner as that in Example 16, except that the amount of propionic acid was changed to be 3 mass %. It could be understood that from a viewpoint of the acid small issue and improvement of the water absorbency (CRC), propionic acid was sufficient in an amount of 1 mass % in high temperature polymerization.

Example 27

In Example 16 (neutralization ratio 70% by mole, propionic acid 1 mass %), since acrylic acid derived from a non-fossil raw material and prepared newly contained 1.2 mass % of propionic acid, the acrylic acid was mixed with acrylic acid derived from a fossil raw material and containing 0.01 mass % of propionic acid at a mixing ratio of 83:17 to adjust propionic acid in an amount of 1%, and polymerization was carried out to obtain the similar result to that of Example 17. It could be understood that the trace components (e.g., propionic acid) could be stabilized and consequently the physical properties could be stabilized by mixing of a plurality of acrylic acids, particularly mixing of acrylic acid derived from a fossil raw material and acrylic acid derived from a non-fossil raw material. Additionally, the 14C value of the obtained water-absorbent resin (28) was coincident with the theoretic value (the ratio of fossil raw material and non-fossil raw material).

INDUSTRIAL APPLICABILITY

A water-absorbent resin with high physical properties is provided. Particularly, propionic acid in the polymerization improves the water absorbency of the water-absorbent resin. Also, use of a plurality of acrylic acid economically stabilizes the physical properties of the water-absorbent resin. Since acrylic acid containing a prescribed amount of propionic acid is used directly for polymerization, there is no need to carry out excess refining of the raw material acrylic acid, which sacrifices the yield and cost of the acrylic acid and thus the water-absorbent resin can be produce at a low cost.

The invention claimed is:

1. A method for producing a polyacrylic acid (salt)-based water-absorbent resin, the method comprising:
   a preparation step in which a monomer is prepared from acrylic acid containing propionic acid;
   a polymerization step in which the monomer is polymerized; and
   a drying step in which the obtained hydrogel is dried, wherein
   Fe on the basis of $Fe_2O_3$ in the monomer is 0.002 to 2 ppm by mass;
   a plurality of acrylic acids having different propionic acid amounts of 1.1 to 50 times by mass with respect to the other acrylic acid are mixed to prepare the monomer;
   a plurality of acrylic acids obtained by different production processes of at least one selected from plant, installation site, raw material, oxide type, and refining type are mixed to prepare the monomer;
   and propionic acid is removed from polyacrylic acid (salt) during polymerization or after polymerization.

2. The method as disclosed in claim 1, wherein 3-hydroxypropionic acid (salt) in the monomer is 2000 ppm or lower.

3. The method as disclosed in claim 1, wherein a flow conductivity SFC to an 0.69 mass % aqueous sodium chloride solution, is $10 \times 10^{-7} \times cm^3 \times s \times g^{-1}$ or higher.

4. The method as disclosed in claim 1, wherein the plurality of acrylic acids are used, and one or some of acrylic acid is/are obtained from a non-fossil raw material and the other(s) is/are obtained from a fossil raw material.

5. The method as disclosed in claim 1, wherein a highest temperature for the polymerization is 100 to 150° C. and the propionic acid is removed during polymerization.

6. The method as disclosed in claim 1, wherein the propionic acid is evaporated by a hot air drying with a drying temperature of 165 to 230° C. and to drying time of 15 minutes or more in the drying step of hydrogel.

7. The method as disclosed in claim 1, wherein the drying step is azeotropic dehydration in a hydrophobic organic solvent by which the propionic acid is removed after polymerization.

8. The method as disclosed in claim 1, wherein the mixing ratio of different acrylic acids is 1:99 to 99:1.

9. The method as disclosed in claim 1, wherein at least a portion of propionic acid is evaporated in the drying step and thereafter and further trapped with acrylic acid and acetic acid.

10. The method as disclosed in claim 1, wherein one or some of acrylic acid containing 400 ppm or more of propionic acid are used to prepare the monomer.

11. The method as disclosed in claim 1, wherein propionic acid is evaporated so as to keep the residual propionic acid in the water-absorbent resin to 2000 ppm or lower in the polymerization step or in the drying step.

12. The method as disclosed in claim 1, wherein the method further comprises a surface-crosslinking step in which preferably the water absorbent resin is surface-crosslinked by using a surface treatment agent containing propanediol or lactic acid after the polymerization step.

13. The method as disclosed in claim 11, wherein a basic substance is added 1.1 to 1000 times by mass with respect to propionic acid after the drying step.

14. The method as disclosed in claim 1, wherein the acrylic acid contains acetic acid in an amount less than that of propionic acid.

* * * * *